United States Patent
Huda et al.

(10) Patent No.: US 11,376,530 B2
(45) Date of Patent: *Jul. 5, 2022

(54) REVERSE OSMOSIS PUSH FILTER WITH FLOATING KEY LOCK

(71) Applicant: KX Technologies LLC, West Haven, CT (US)

(72) Inventors: Stephen P. Huda, Shelton, CT (US); Michael J. Sherman, Woodbury, MN (US); Steven J. Haehn, Oakdale, MN (US); Erik R. Klimpel, Woodbury, MN (US); Sathyanarayana Jujaray, Bangalore (IN); Vivek Kunwar Narendra Singh, Nagpur (IN)

(73) Assignee: KX Technologies LLC, West Haven, CT (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/814,279

(22) Filed: Mar. 10, 2020

(65) Prior Publication Data

US 2020/0206660 A1 Jul. 2, 2020

Related U.S. Application Data

(60) Division of application No. 15/879,667, filed on Jan. 25, 2018, now Pat. No. 10,695,698, which is a
(Continued)

(51) Int. Cl.
*B01D 29/96* (2006.01)
*B01D 17/00* (2006.01)
*B01D 35/30* (2006.01)

(52) U.S. Cl.
CPC ............. *B01D 29/96* (2013.01); *B01D 17/10* (2013.01); *B01D 35/30* (2013.01);
(Continued)

(58) Field of Classification Search
None
See application file for complete search history.

(56) References Cited

U.S. PATENT DOCUMENTS 3,679,317 A 7/1972 Larson
3,694,603 A 9/1972 Congelliere
(Continued)

FOREIGN PATENT DOCUMENTS

DE 102006044744 3/2008
KR 200415015 4/2006
(Continued)

*Primary Examiner* — Benjamin M Kurtz
(74) *Attorney, Agent, or Firm* — DeLio Peterson & Curcio LLC; Robert Curcio

(57) ABSTRACT

A reverse osmosis filter assembly for fluid filtration having a push-activated lock and release mechanism. A push filter design activates a floating key lock upon insertion and extraction, where the filter key may be used simultaneously as a lock and as an identifier for particular filter attributes. The filter base may be situated inline, and in fluid communication, with the raw water ingress, permeate egress, and reject water egress. The reverse osmosis filter housing assembly may be attached to, and removed from, the filter base by a push-actuated release. Upon insertion, the filter key shifts the filter lock longitudinally to receive interlocking segments. Upon extraction, the same axial push shifts the filter lock further to align the interlocking fingers within gaps that allow for easy extraction. The specific key lock design allows a user to identify and match certain filter configurations received by the mechanical support, and reject other filter configurations.

18 Claims, 24 Drawing Sheets

Related U.S. Application Data division of application No. 14/800,725, filed on Jul. 16, 2015, now Pat. No. 9,901,852, which is a continuation-in-part of application No. 14/053,086, filed on Oct. 14, 2013, now Pat. No. 9,233,322, which is a continuation-in-part of application No. 13/645,726, filed on Oct. 5, 2012, now Pat. No. 8,673,146, which is a continuation of application No. 13/396,316, filed on Feb. 14, 2012, now Pat. No. 8,366,930, which is a continuation of application No. 12/188,816, filed on Aug. 8, 2008, now Pat. No. 8,137,551.

(52) U.S. Cl.
CPC ............ *B01D 2201/303* (2013.01); *B01D 2201/4053* (2013.01); *F25D 2323/121* (2013.01)

(56) References Cited

U.S. PATENT DOCUMENTS

| | | |
|---|---|---|
| 4,308,440 A | 12/1981 | Buttner |
| 4,392,029 A | 7/1983 | Schaad |
| 5,035,797 A | 7/1991 | Janik |
| 5,135,645 A | 8/1992 | Sklenak et al. |
| 5,147,722 A | 9/1992 | Koslow |
| 5,700,371 A | 12/1997 | Koslow |
| 5,914,037 A | 6/1999 | Yen |
| 6,331,037 B1 | 12/2001 | Roscher et al. |
| 6,595,371 B1 | 7/2003 | Desmarais |
| 6,630,016 B2 | 10/2003 | Koslow |
| 6,632,355 B2 | 10/2003 | Fritze |
| 6,797,167 B2 | 9/2004 | Koslow |
| 6,835,311 B2 | 12/2004 | Koslow |
| 6,872,311 B2 | 3/2005 | Koslow |
| 8,137,551 B1 * | 3/2012 | Huda ............... B01D 29/96 210/232 |
| 8,366,930 B2 | 2/2013 | Huda |
| 9,233,322 B1 * | 1/2016 | Huda ............... B01D 35/306 |
| 9,901,852 B2 * | 2/2018 | Huda ............... B01D 17/10 |
| 10,695,698 B2 * | 6/2020 | Huda ............... B01D 29/96 |
| 11,045,753 B2 * | 6/2021 | Huda ............... B01D 35/14 |
| 2003/0024860 A1 | 2/2003 | Fritze |
| 2004/0119297 A1 | 6/2004 | Bella |
| 2005/0051487 A1 | 3/2005 | Koslow |
| 2005/0111827 A1 | 5/2005 | Sullivan |
| 2005/0252841 A1 | 11/2005 | Bassett |
| 2006/0000761 A1 | 1/2006 | Choi et al. |
| 2006/0151371 A1 | 7/2006 | Weinberger |
| 2007/0199876 A1 | 8/2007 | Tubby et al. |
| 2008/0047889 A1 | 2/2008 | Huda |
| 2013/0068672 A1 | 3/2013 | Kruckenberg et al. |

FOREIGN PATENT DOCUMENTS

| | | |
|---|---|---|
| KR | 200428894 | 10/2006 |
| KR | 100804302 | 2/2008 |

\* cited by examiner

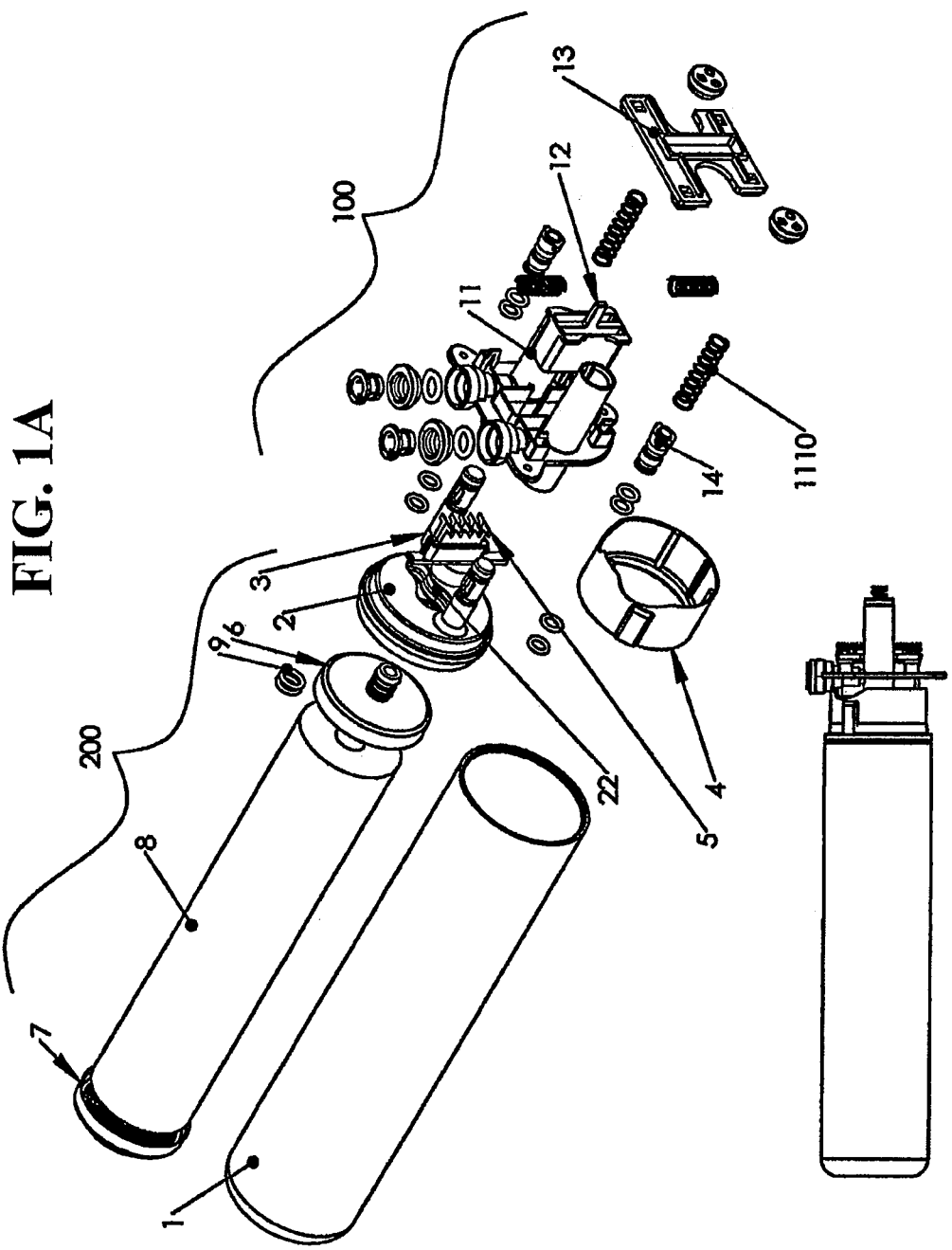

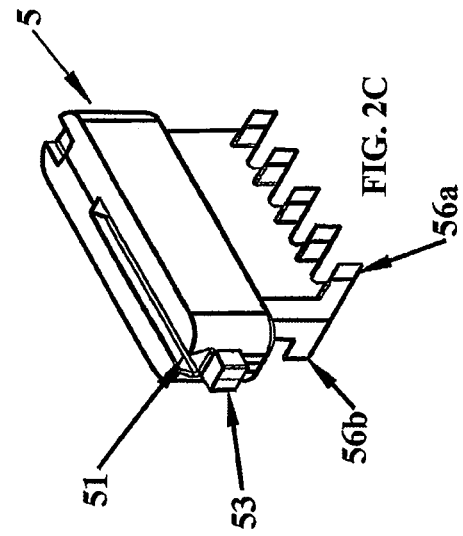
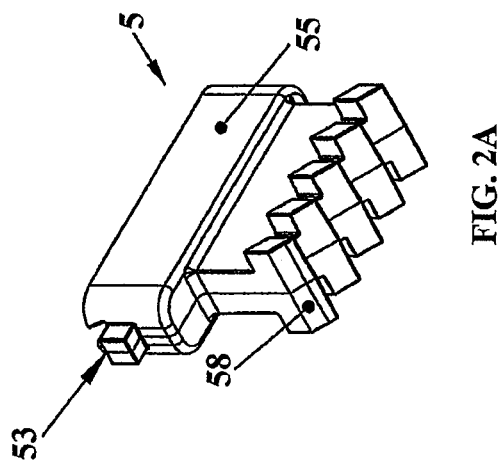
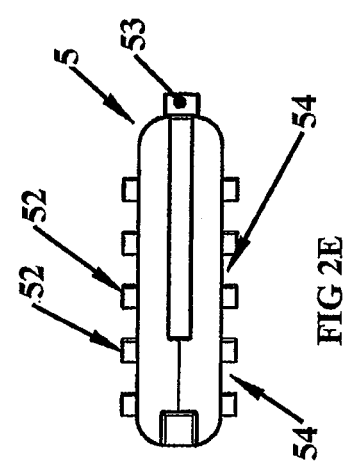
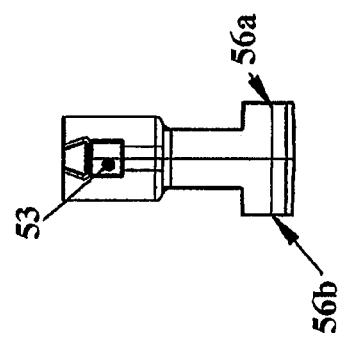
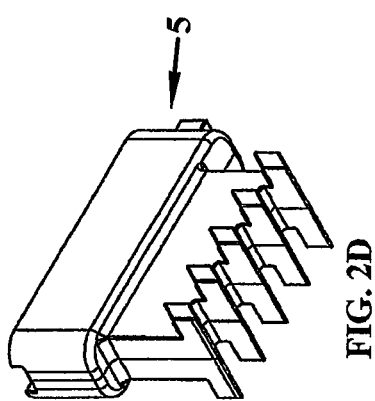
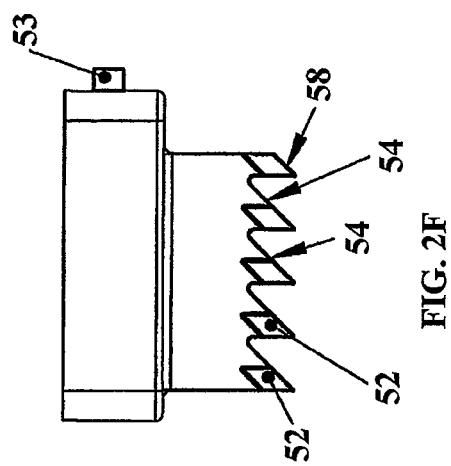

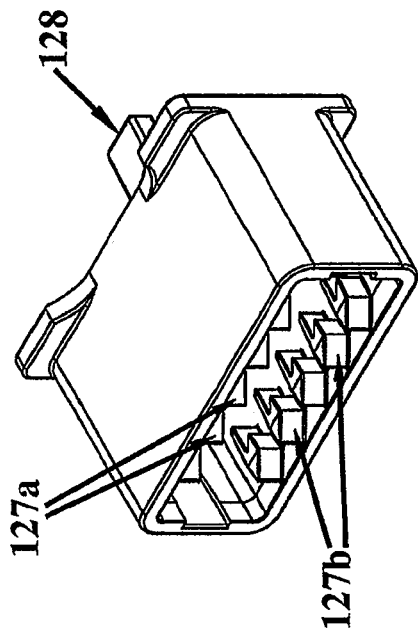
FIG. 3A
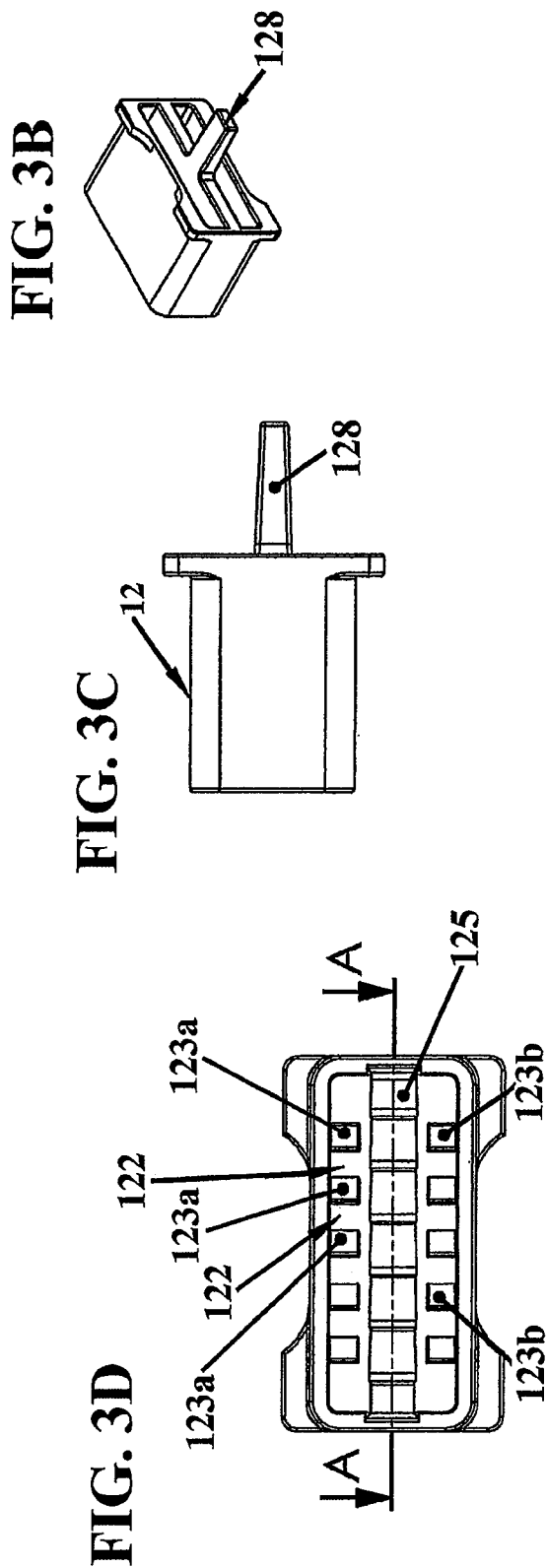
FIG. 3B
FIG. 3C
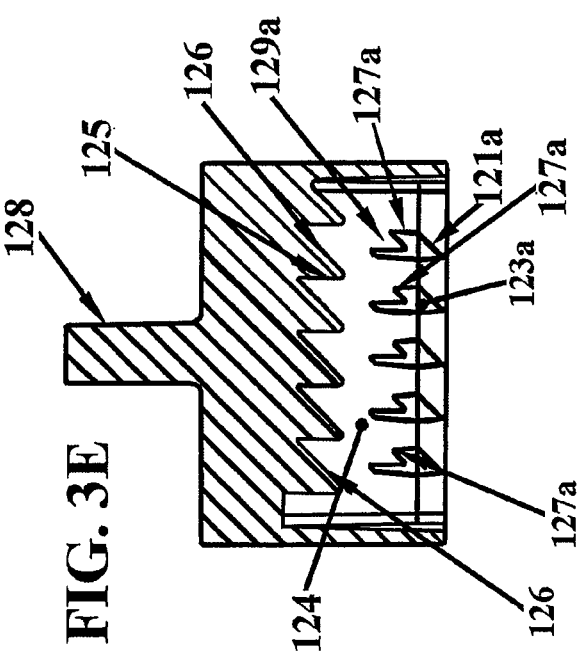
FIG. 3E
FIG. 3D

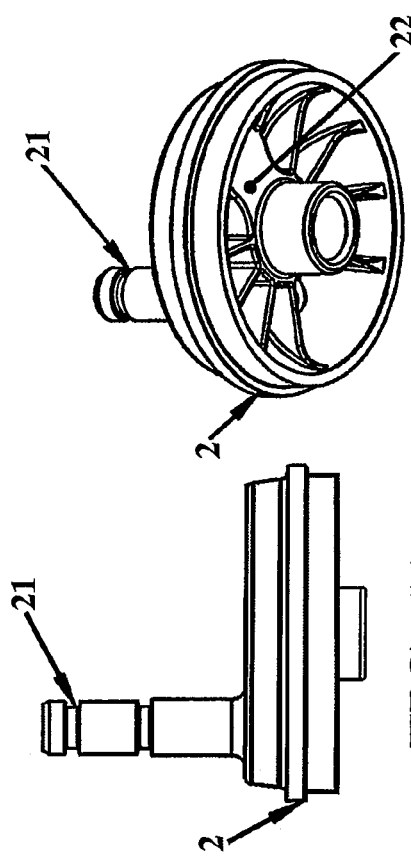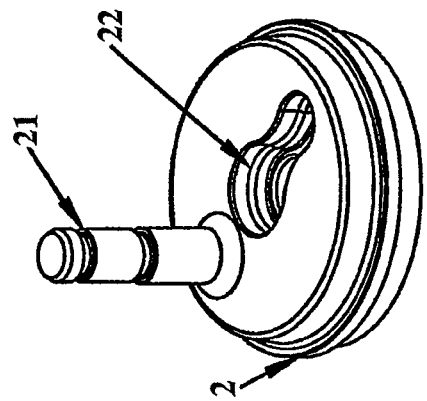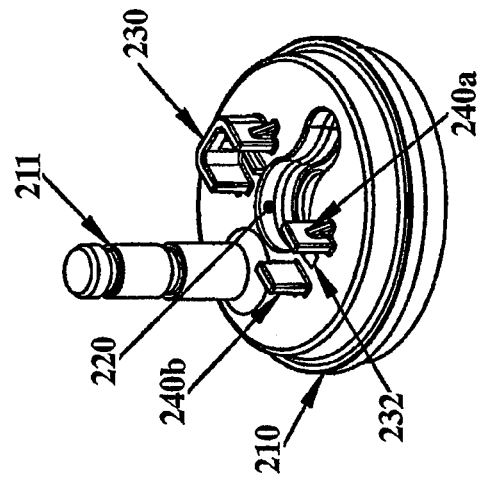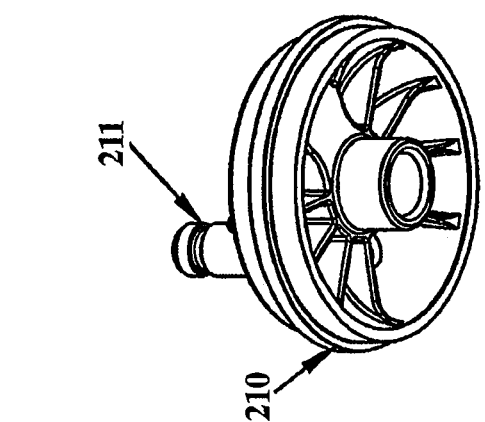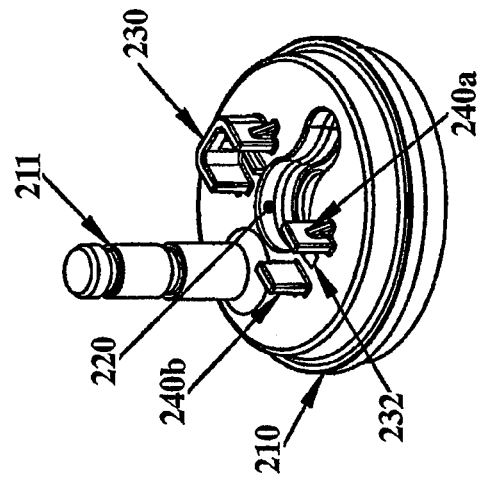

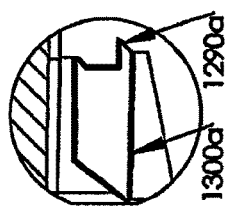
FIG. 8D
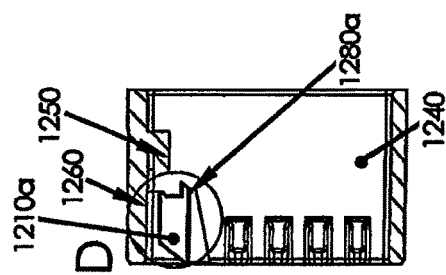
FIG. 8G
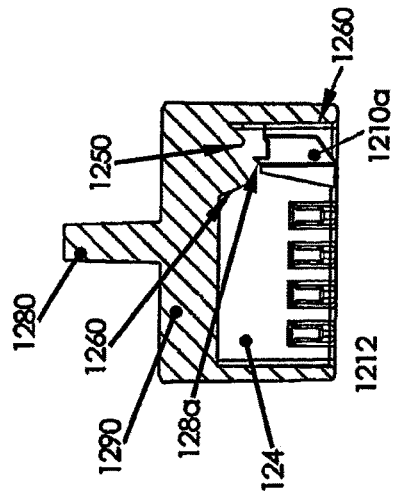
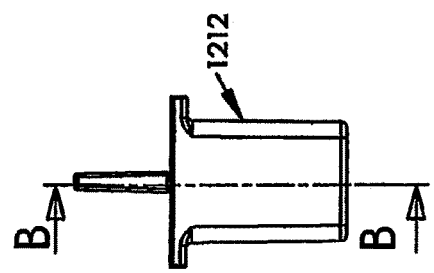
FIG. 8F
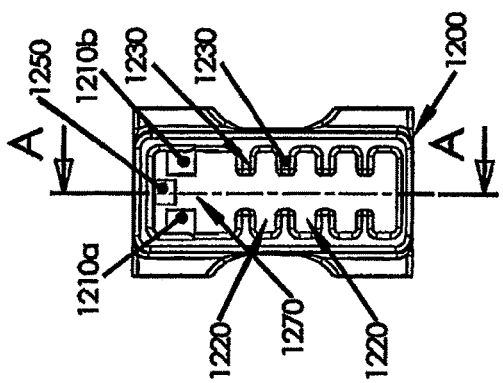
FIG. 8C
FIG. 8B
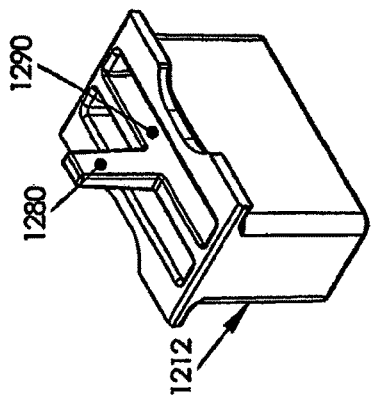
FIG. 8E
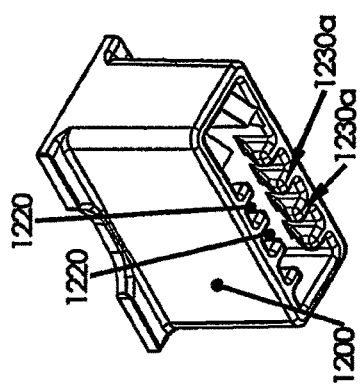
FIG. 8A

REVERSE OSMOSIS PUSH FILTER WITH FLOATING KEY LOCK

BACKGROUND OF THE INVENTION

1. Field of the Invention

This invention relates to a filtering apparatus, specifically a reverse osmosis filter housing apparatus to facilitate easy removal and replacement of a filter housing from a mechanical support, and more specifically, to a push filter design that activates a floating key lock, where the key may be used simultaneously as a lock and as an identifier for particular filter attributes. The mechanical support may be situated inline, and in fluid communication, with influent and effluent piping. More specifically, the invention relates to a reverse osmosis filter housing and mount, whereby the filter housing may be attached to, and removed from, the mount by a push-actuated release. A controlled attachment or detachment of the filter sump, containing the filter media, is activated by the axial push of the sump towards the mechanical support. The specific key lock design allows a user to identify and match certain filter configurations received by the mechanical support, and reject other filter configurations. An internal shutoff, activated by the push-actuated release, blocks spillage during filter housing removal and replacement.

2. Description of Related Art

The invention relates to a water filtration system having a locking and unlocking mechanism for changing the filter when the filter media has served its useful life. The use of liquid filtration devices is well known in the art as shown in U.S. Pat. Nos. 5,135,645, 5,914,037 and 6,632,355. Although these patents show filters for water filtration, the filters are difficult to replace owing to their design and placement. For example, U.S. Pat. No. 5,135,645 discloses a filter cartridge as a plug-in cartridge with a series of switches to prevent the flow of water when the filter cartridge is removed for replacement. The filter must be manually inserted and removed and have a switch activated to activate valve mechanisms so as to prevent the flow of water when the filter is removed. The cover of the filter is placed in the sidewall of a refrigerator and is employed to activate the switches that activate the valves. The filter access is coplanar with the refrigerator wall and forces an awkward access to the filter cartridge.

In U.S. patent application Ser. No. 11/511,599 filed on Aug. 28, 2006, for Huda, entitled "FILTER HOUSING APPARATUS WITH ROTATING FILTER REPLACEMENT MECHANISM," a filter assembly having a rotor actuating mechanism including a first internal rotator and a second internal rotator is taught as an efficient way to insert, lock, and remove the filter housing from its base. A simple push mechanism actuates the self-driving release and change over means that hold and release the filter housing or sump, and provide influent shutoff to prevent leaking and spillage. Rotational shutoff and locking mechanisms are activated and released by axial force on the filter housing at the commencement of the filter changing procedure.

The push-push design of the instant invention is particularly useful as the water filtering system for a refrigerator having water dispensing means and, optionally, an ice dispensing means. The water used in the refrigerator or water and ice may contain contaminants from municipal water sources or from underground well or aquifers. Accordingly, it is advantageous to provide a water filtration system to remove rust, sand, silt, dirt, sediment, heavy metals, microbiological contaminants, such as Giardia cysts, chlorine, pesticides, mercury, benzene, toluene, MTBE, Cadmium bacteria, viruses, and other known contaminants. Particularly useful water filter media for microbiological contaminants include those found in U.S. Pat. Nos. 6,872,311, 6,835,311, 6,797,167, 6,630,016, 6,331,037, and 5,147,722, and are incorporated herein by reference thereto.

The implementation of a push-push design for filter cartridge insertion and removal has not been employed in reverse osmosis systems. As discussed further herein, a reverse osmosis design requires an additional port, making the attachment scheme more complex than that of a simple filter cartridge system for typical refrigerator use.

Reverse Osmosis, a water treatment method traditionally known for removing salt from seawater, is also used to purify drinking water by forcing untreated water molecules through a semi-permeable membrane or filter. The membrane blocks contaminants and the impurities are subsequently expelled from the environment.

It is a process where a weaker saline solution will tend to migrate to a strong saline solution; that is, a solution that is less concentrated will have a natural tendency to migrate to a solution with a higher concentration. Reverse osmosis occurs when the solution is moved across a membrane against the concentration gradient, from lower concentration to higher concentration. For example, under normal osmosis, a semipermeable membrane with fresh water on one side and a concentrated aqueous solution on the other side would have the fresh water cross the membrane to dilute the concentrated solution. In reverse osmosis, pressure is exerted on the side with the concentrated solution to force the water molecules across the membrane to the lower concentration side.

A typical reverse osmosis water filtering system uses a semi-permeable membrane that has the ability to remove and reject a wide spectrum of impurities and contaminants from water. These contaminants are automatically rinsed down the drain. The purified water is then stored in a tank.

The predetermined pressure is applied to the incoming water to force the incoming water through the membrane. The membrane filters impurities from the incoming water leaving purified water on the other side of the membrane, which is referred to as "permeate" stream. The impurities left on the membrane are washed away by a portion of the incoming water that does not pass through the membrane. The water carrying the impurities washed away from the membrane is called "concentrate stream."

Some of the benefits of employing a RO system include: pure, clean drinking water; removal of unwanted odors or tastes; and minimal maintenance. However, the extra port and additional water disposal means requires added complexity during attachment and detachment, which the present design facilitates.

In the operation of reverse osmosis systems, the input liquid is divided into two output streams—the permeate stream which is substantially free of the dissolved substance and the concentrate stream which contains the majority of the substance to be removed. Reverse osmosis systems utilize a semi-permeable membrane with the input stream being fed at a pressure substantially above the osmotic pressure of the feed solution. When it is fed across the membrane, water molecules preferentially pass through the membrane with a very limited amount of the dissolved substances also passing through the membrane, depending upon the type of membrane and operation of the system.

Reverse osmosis is generally utilized in water purifiers after particulate/sediment filters and chlorine removal components/devices as a secondary or tertiary water purification technology employing a semipermeable membrane to remove very small particles and dissolved substances which may include microorganisms, as well as molecules of organic compounds of natural and man-made origin, charged species of elements such as calcium (Ca), magnesium (Mg), lead (Pb), arsenic (As), as also ions such as carbonates, sulfates, chlorides, and the like, from drinking water. A semipermeable membrane is a membrane that will allow some atoms or molecules to pass but not others. Reverse osmosis can thus remove many types of molecules and ions from solutions, including microorganisms, and is used in both industrial processes and the production of potable water.

The water stream that carries the concentrated contaminants that did not pass through the RO membrane is generally referred to as the waste (reject or brine) stream.

The present invention employs the push-push design for cartridge insertion and removal to a reverse osmosis system.

SUMMARY OF THE INVENTION

The present invention is directed to, in a first aspect, a reverse osmosis filter cartridge comprising: a sump housing for enclosing a reverse osmosis filter media, the sump housing having a body and a cap for forming a fluid-tight seal with the body, the sump housing including: a raw water inlet port; a permeate egress port; a reject water egress port; and a filter key located on the sump housing and having a top surface, longitudinal sides, and lateral sides shorter than the longitudinal side, the filter key including a plurality of spaced protrusions or fingers on each longitudinal side extending laterally from the lateral sides approximate the top surface.

The fingers may include winged extensions for mating attachment to a filter base or manifold, and may include slanted or angled faces. The fingers may be diamond shaped in cross-section.

An elongated protrusion is presented extending radially outwards from the sump housing body for slidably attaching the filter key. The filter key includes a groove complementary to the elongated protrusion for insertably securing the filter key to the sump housing by slideably mating the elongated protrusion of the filter housing within the filter key groove.

The filter key may be attached to the sump housing by snap fit, friction fit, welding, or bonding.

The RO system raw water ingress port, the permeate egress port, and the reject water egress port extend radially from a side surface of the sump housing body. The permeate egress port and the reject water egress port are off axial center of the filter housing.

In a second aspect, the present invention is directed to a reverse osmosis filter assembly comprising: a filter housing for enclosing a reverse osmosis filter media; the filter housing having three ports for raw water ingress, permeate fluid egress, and reject water egress, the three ports in fluid communication with the filter media, the filter housing having a filter cap forming a fluid-tight seal with the filter housing and a first attachment structure for receiving a filter key; and the filter key having a top surface, a bottom, longitudinal sides, and lateral sides shorter than the longitudinal sides, the filter key including a plurality of spaced protrusions or fingers on each longitudinal side extending laterally from the top surface; and a second attachment structure located on the filter key bottom for attaching the filter key to the first attachment structure on the filter housing.

The filter key is fixably or removably attached to the filter housing, and may include fingers having slanted or angled faces on winged extensions.

The first attachment structure preferably includes an elongated protrusion extending from the filter housing, and the second attachment structure includes a groove complementary to the elongated protrusion for insertably securing the filter key to the filter housing by slidably mating the elongated protrusion of the filter housing within the groove.

In a third aspect, the present invention is directed to a reverse osmosis filter base for releasably connecting a complementary mating reverse osmosis filter cartridge, wherein the reverse osmosis filter base comprises: a base platform having a raw water ingress port, a permeate egress port, and a reject water egress port; and a floating lock in sliding communication with the base platform, having a bottom surface, a top surface, longitudinal sides, and lateral sides shorter than the longitudinal sides, the floating lock including: spaced protrusions, drive keys, or fingers on the longitudinal sides extending laterally inwards, including at least one shaped protrusion, finger, or drive key for slidably contacting the complementary mating reverse osmosis filter cartridge, the at least one shaped protrusion, finger, or drive key including an angled face exposed towards the bottom surface.

The floating lock includes a position stop centered about the lateral sides, and located above the at least one drive key to provide a physical stop during insertion of the complementary mating filter key. The drive key includes a track structure longitudinally across the floating lock.

In a fourth aspect, the present invention is directed to a reverse osmosis filter base in combination with a reverse osmosis filter housing assembly, the combination comprising: a filter base having a raw water ingress port, a permeate egress port, and a reject water egress port on a base platform; a slidable floating lock in slidable contact of the filter base, the floating lock having a plurality of drive keys or lateral extensions separated by gaps; a resilient member in contact with the floating lock, providing a retraction force for the floating lock; a filter housing assembly including a housing and a top portion, a first attachment structure and an elongated protrusion extending from the housing or the top portion; and a filter key located on the filter housing assembly, the filter key having longitudinal sides and lateral sides shorter than the longitudinal sides, the filter key including: a plurality of spaced protrusions or fingers on each longitudinal side of the filter key extending laterally from the top surface, wherein the fingers include extensions having slanted or angled faces for mating attachment to the filter base; a second attachment structure having a groove complementary to the elongated protrusion for insertably securing the filter key to the filter head top surface by slidably mating the elongated protrusion of the filter head within the groove.

The floating lock includes: a bottom surface, a top surface, and longitudinal and lateral sides shorter than the longitudinal sides, and drive keys on the longitudinal sides extending laterally inwards at the bottom surface for slidably receiving the filter key, each of the drive keys including an angled portion exposed towards the bottom surface, and an edge or wedge on each of the drive key bottom for releasably contacting with a portion of the filter key; and a position key centered about the floating lock, and located above the drive keys to provide a physical stop during insertion of the filter housing assembly.

It is an object of this invention to provide a reverse osmosis filter housing apparatus mounted to a base and having an automatic locking mechanism for simple replacement and removal.

It is an object of this invention to provide a reverse osmosis filter housing apparatus and base attached by a push activated, slideably moveable, floating lock.

It is another object of this invention to provide a reverse osmosis filter housing apparatus mounted on a surface having non-rotating locking means with pressure activation for replacement and removal.

It is another object of the present invention to provide a reverse osmosis filter housing apparatus that allows for a keyed identification of the filter.

It is a further object of this invention to provide a reverse osmosis filter housing apparatus for use with water dispensing and\or ice dispensing apparatus whereby filtered water is provided to the water dispensing and/or ice dispensing apparatus.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s), which follows, taken in conjunction with the accompanying drawings in which:

FIG. 1A is a top exploded view of one embodiment of a filter assembly of the present invention;

FIG. 1B is a side plan view the embodiment of the filter housing assembly of FIG. 1A;

FIG. 2A is a perspective view of one embodiment of the filter key of the present invention;

FIG. 2B is a lateral side view of the filter key of FIG. 2A;

FIG. 2C depicts a bottom plan view of the filter key of FIG. 2A showing a groove and a locking nub or tab for attachments;

FIG. 2D depicts a perspective view from the opposite side of the filter key of FIG. 2C;

FIG. 2E depicts a bottom view of the filter key of FIG. 2A;

FIG. 2F is a longitudinal side view of the filter key of FIG. 2A;

FIG. 3A depicts a perspective view of one embodiment of the floating lock or sliding lock of the present invention;

FIG. 3B is a perspective view from the opposite side of the floating lock of FIG. 3A;

FIG. 3C is a lateral side view of the floating lock of FIG. 3A;

FIG. 3D depicts a top view of the floating lock of FIG. 3A;

FIG. 3E depicts cross-sectional longitudinal side view of the floating lock of FIG. 3A;

FIG. 5A is a side view of one embodiment of the filter head of the present invention;

FIG. 5B is a bottom perspective view of the filter head of FIG. 5A;

FIG. 5C is a top perspective view of the filter head of FIG. 5A;

FIG. 5D is another embodiment of the filter head with a snap fit lock for the filter key;

FIG. 5E is a bottom perspective view of the filter head of FIG. 5D;

FIG. 5F is a top perspective view of the filter head depicting the aperture for receiving the filter key;

FIG. 8A depicts a perspective view of an embodiment of the floating lock of the present invention;

FIG. 8B is a top view of the floating lock of FIG. 8A;

FIG. 8C is a cross-sectional view of the floating lock of FIG. 8A depicting a drive key located at one end of the floating lock on the longitudinal or side panel;

FIG. 8D depicts an exploded view of the drive key of FIG. 8C showing the edge angle and face;

FIG. 8E depicts a perspective view of a floating lock having an extension member;

FIG. 8F is a side view of the floating lock of FIG. 8E having an extension member;

FIG. 8G is a lateral or cross-sectional view of the floating lock of FIG. 8E with an extension member;

DETAILED DESCRIPTION OF THE PREFERRED EMBODIMENT(S)

Figure 1C:
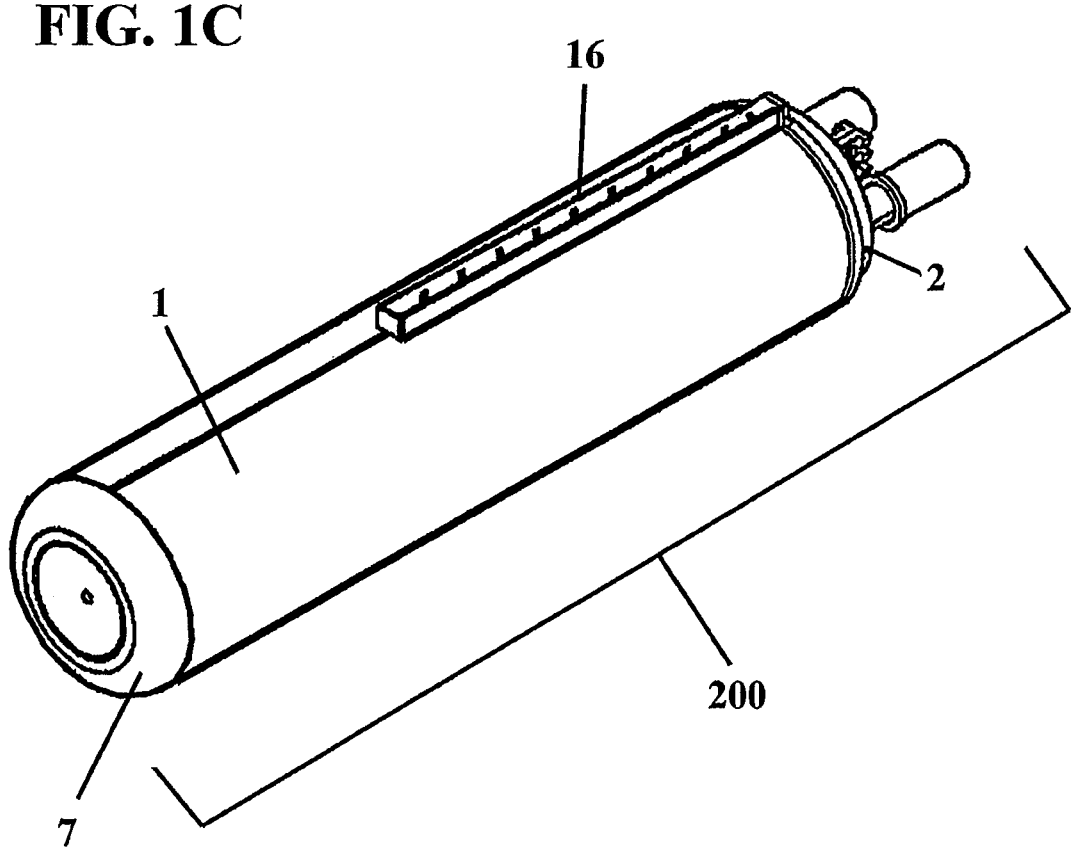
FIG. 1C depicts a perspective view of the filter housing assembly with strengthening ribs extending at least partially down the outer surface of the filter housing.

In describing the preferred embodiment of the present invention, reference will be made herein to FIGS. 1 to 16 of the drawings in which like numerals refer to like features of the invention. Features of the invention are not necessarily shown to scale.

The present invention is directed to a filter housing assembly for filtration of liquids, including the interception of chemical, particulate, and/or microbiological contaminants. The use of the mechanical locking assembly of the filter housing without the need for excess force and tight tolerances essential in prior art filter housings makes for easy and frequent filter changes and optimal filter performance. The filter housing assembly of the present invention provides simplified filter changes to minimize process downtime and without recourse to tools. A simple push mechanism actuates the self-driving release and change over means that hold and release the filter housing sump or filter cartridge, and provides influent shutoff means to prevent leaking and spillage. A floating lock or sliding lock responsive to an axial insertion force from the filter cartridge (for embodiments having ingress and egress ports extending axially upwards from the filter cartridge) or responsive to a radial insertion force from the filter cartridge (for embodiments having ingress and egress ports extending radially from the filter cartridge), moves in the first instance, in the axial direction parallel to the filter cartridge axis, and in the second instance, perpendicular or radially to the axial motion of the sump, when the filter cartridge motion is radially inwards, and in either instance allows a specific filter key to insert within the floating lock. Once inserted, the floating lock retracts towards its original position under a resilient force, such as two springs in tandem, or other complementary resilient mechanism keeping the floating lock under retraction tension when moved from its initial position. The filter key and floating lock combination allows for the identification of specific filter models and may be configured to reject all but specific filter types.

Removal of the filter cartridge is performed in the same manner. For ingress and egress ports located in the axial direction, an axial insertion force causes the floating lock to move in the radial direction, which allows the filter key to be removed from the floating lock. For ingress and egress ports located in a radial direction, a radial insertion force causes the floating lock to move in the axial direction, which allows the filter key to be removed from the floating lock. An extraction force provided by spring tension, or the like, helps push the filter cartridge out of its base. Fluid shutoff and locking mechanisms are initiated by the force on the filter cartridge at the commencement of the filter changing procedure.

The present invention is described below in reference to its application in connection with, and operation of, a water treatment system. However, it should be apparent to those having ordinary skill in the art that the invention may be applicable to any device having a need for filtering liquid.

FIG. 1A is a top exploded view of one embodiment of the filter assembly of the present invention. In this embodiment, the ingress and egress ports are presented in the axial direction. The filter assembly is fixably secured in a position within an operating environment requiring fluid filtration, such as attached to an internal sidewall of a refrigerator, although certainly other operating environments may be envisioned, and the filter assembly may be used in any number of environments where the filter assembly has access to, and can be placed in fluid communication with, influent and effluent fluid access ports. For illustrative purposes only, application to the filtering of water being piped into a refrigerator is discussed.

In a first embodiment, a filter housing assembly 200 comprises the removable, detachable filter cartridge or sump of the filter assembly from a filter base 100. It should be noted that many of the features perform in the same manner if the attachment scheme is presented in the radial direction. Filter housing assembly 200 includes a filter housing 1, which encloses filter media 8, a filter head 2 that attaches at one end to filter housing 1, and attaches at the other end to a filter manifold 3 and non-floating port 11. A filter key 5 is attached to filter manifold 3. Filter base 100 includes non-floating port 11, floating lock 12, and rear plate 13. Filter head 2 secures in a water-tight fit to filter housing 1. The attachment scheme may be made by a water-tight screw fit, bond, weld, or other water-tight fastening mechanism commonly used in the art for sealing adjoining components, typically adjoining plastic components. As discussed in further detail below, filter key 5 is connected to filter manifold 3. Filter key 5 may be formed as one piece with filter manifold 3, or may be securely attached by other methods, such as bonding, welding, press fit, friction fit, or the like. Filter key 5 may also be removably attached for replacement by an end user. Filter manifold 3 is attached to filter head 2. Filter media 8 is located in filter housing 1. Each end of filter media 8 is secured by a cap that facilitates the direction of the fluid being treated by the filter. At one end, filter media 8 is secured by a closed end cap 7, and at the other end by open end cap 6. Filter media 8 may be any filter media known in the art, and preferably, is a carbon block filter. It is typically shaped in a similar fashion as filter housing 1, which in the preferred embodiment is cylindrical. Open end cap 6 is designed to interface and be in fluid communication with filter head 2.

Figures 12A, 12B:
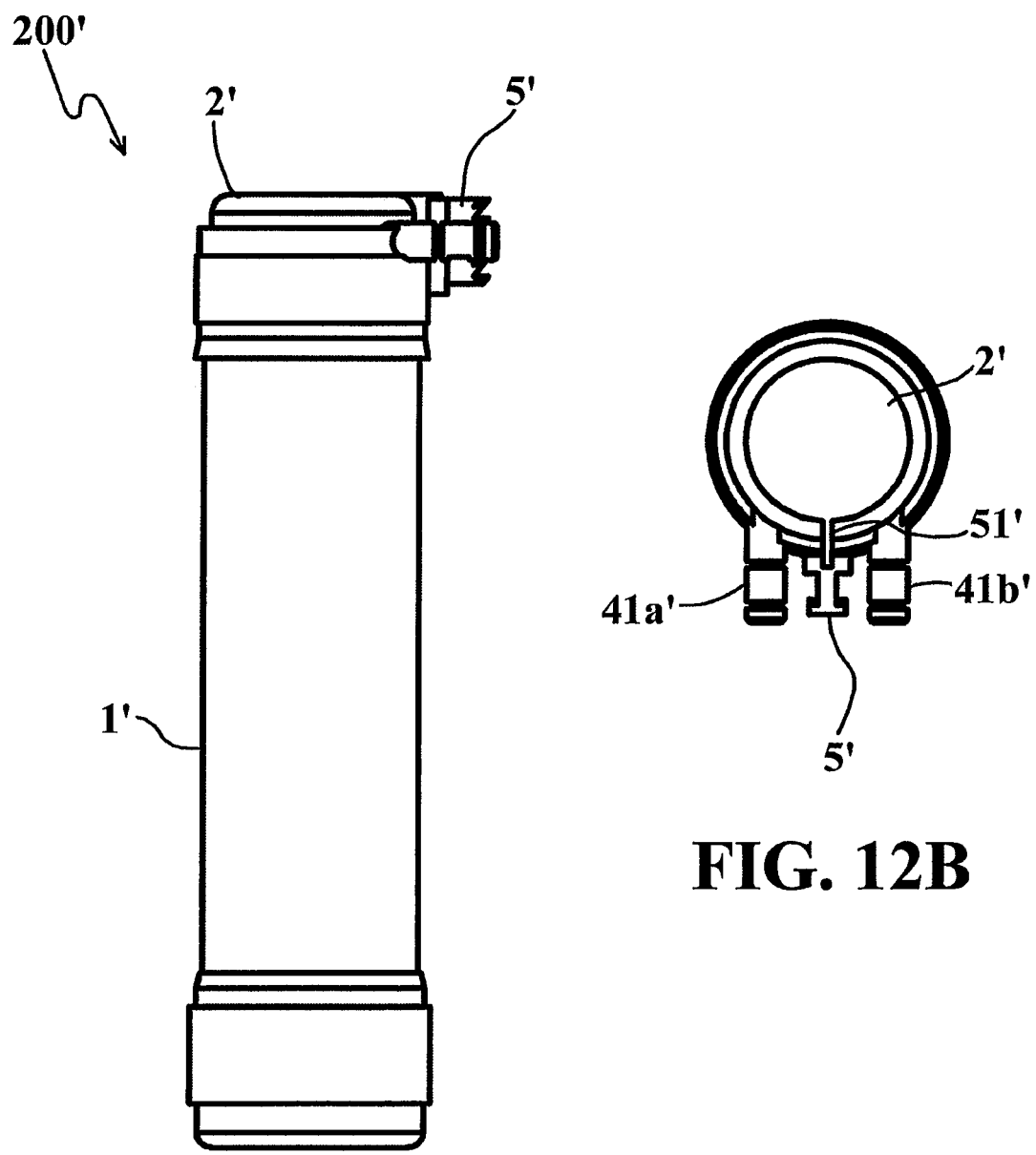
FIG. 12A is a side view of a filter housing assembly having a radially removable, detachable filter cartridge or sump of the filter assembly of the present invention.
FIG. 12B depicts a top view of the filter housing assembly of FIG. 12A with radially projecting ingress and egress ports.

In a second embodiment, as depicted in FIG. 12A, a filter housing assembly 200' comprises a radially removable, detachable filter cartridge or sump of the filter assembly from a filter base (not shown). Filter housing assembly 200' includes a filter housing 1', which encloses filter media, a filter head 2' that attaches at one end to filter housing 1', and attaches at the other end to a filter base having a non-floating port (not shown). A filter key 5' is attached to either filter head 2', filter housing 1', or both. Alternatively, it may also be attached to a filter manifold. FIG. 12B depicts a top view of filter housing assembly 200' with radially projecting ingress and egress ports 41a',b' respectively.

Figure 12C:
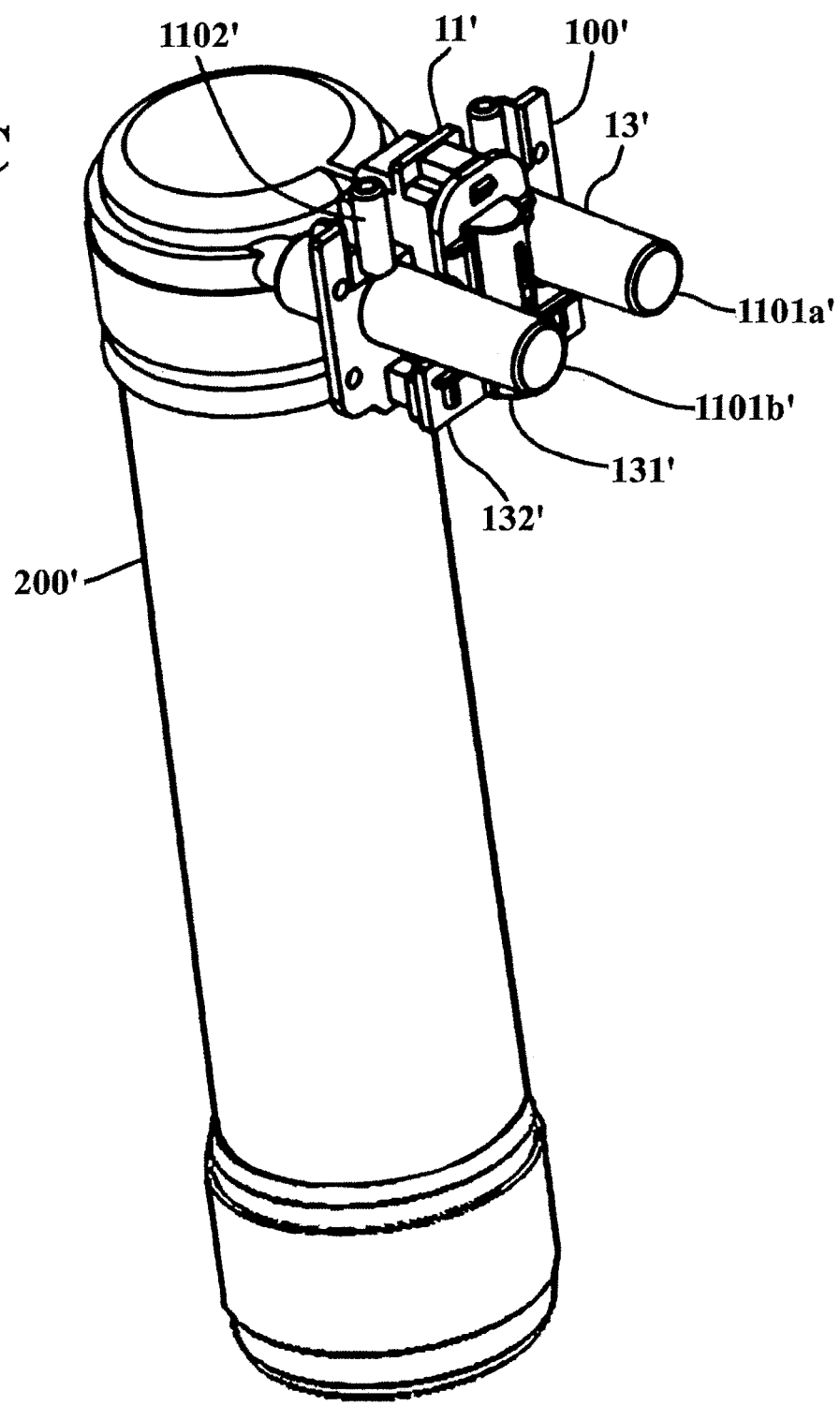
FIG. 12C depicts a perspective view of filter housing assembly of FIGS. 12A and 12B radially attached to a filter base, which includes non-floating port and rear plate.

FIG. 12C depicts a perspective view of filter housing assembly 200' radially attached to filter base 100', which includes non-floating port 11', floating lock 12' (not shown), and rear plate 13'. Filter head 2' secures in a water-tight fit to filter housing. As depicted in FIG. 12B, filter key 5' may be formed securely attached to the filter housing assembly 200' by such methods as bonding, welding, press fit, friction fit, or the like. Filter key 5' may also be removably attached for replacement by an end user.

In another embodiment, filter housing 1 may include strengthening ribs 16 longitudinally located on the filter housing outer surface. FIG. 1C depicts a perspective view of filter housing assembly 200 with a row of strengthening ribs extending at least partially down the outer surface of filter housing 1. Strengthening ribs 16 also function as a guide for inserting filter housing assembly 200 into a shroud (not shown) that may be part of the installation assembly for ensuring proper alignment with filter base 100. Strengthening ribs 16 is preferably integral with filter housing 1, but may also be attachable as a separate component part. Ribs 16 may extend the full length of filter housing 1, or as shown, may extend to an intermediate point between filter housing assembly 200 end caps 6, 7.

Filter housing assembly 200 (as well as filter housing assembly 200') is a finished assembly including filter housing 1, which encompasses filter media 8 by closed end cap 7 at one end, and open end cap 6 at the other. Generally, O-ring seals, such as O-ring seal 9, are used to prevent water leakage where different components are expected to mate.

Filter manifold 3 and filter key 5 are joined with filter head 2, and secured to filter housing 1 to form the assembled filter housing apparatus 200. These components may be integral, permanently secured, or removably attached to one another, and to filter head 2. FIG. 1B is a side plan view of the axial ingress and egress port embodiment of the filter assembly of the present invention. A complementary arrangement may be made for the radial ingress and egress port embodiment of FIG. 12.

FIG. 2A is a perspective view of filter key 5, and is also applicable to filter key 5' of the radial embodiment. FIG. 2B is a lateral side view of filter key 5. As previously noted, in the axial port embodiment, the bottom of filter key 5 is attached to filter manifold 3 by any number of fastening schemes, or may be integrally formed with filter manifold 3. FIG. 2C depicts a groove 51 that is preferably shaped to receive a complementary protrusion on filter manifold 3 in the axial port embodiment, and is preferably shaped to receive a dovetail protrusion; however, other connecting, complementary shapes are not excluded. A similar attachment scheme is available for the radial port embodiment, as depicted in FIG. 12B, with groove 51' attached to or formed with filter head 2', or filter assembly 200'. The groove shapes may vary as discussed below, provided they secure filter key 5, 5' to the respective filter housing structure.

Figure 2G:
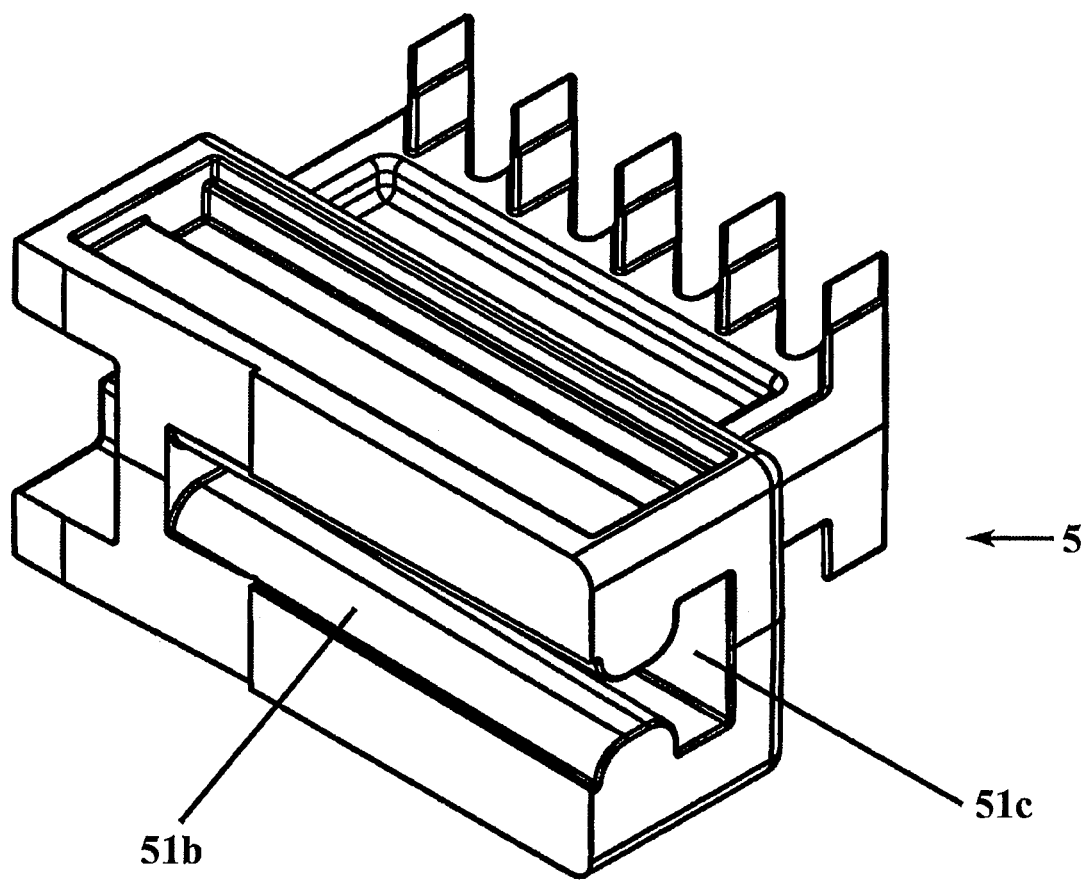
FIG. 2G depicts a slotted groove which includes a wider upper portion for securely affixing the filter key to the filter head or filter manifold.

FIG. 2G depicts a slotted groove 51b that is not a dovetail joint. Slotted groove 51b may include a wider upper portion 51c to more securely affix filter key 5 to filter manifold 3. The connection of filter key 5 with filter manifold 3 may be bonded, sonic welded, press fitted, friction fitted, or the like. As depicted in the axial port embodiment, groove 51 is shaped to accept a snap feature for a press or snap fit located on filter manifold 3. In this manner filter key 5 may be removably attached to filter manifold 3. Similarly, filter manifold 3 may be designed to be removably attached to filter head 2. Thus, the design has more flexibility to introduce and accommodate different key configurations, which can be used to designate specific filter types, and purposely reject other filter types. Filter key 5' may be removed from filter housing assembly 200' in a similar manner.

Figure 2H:
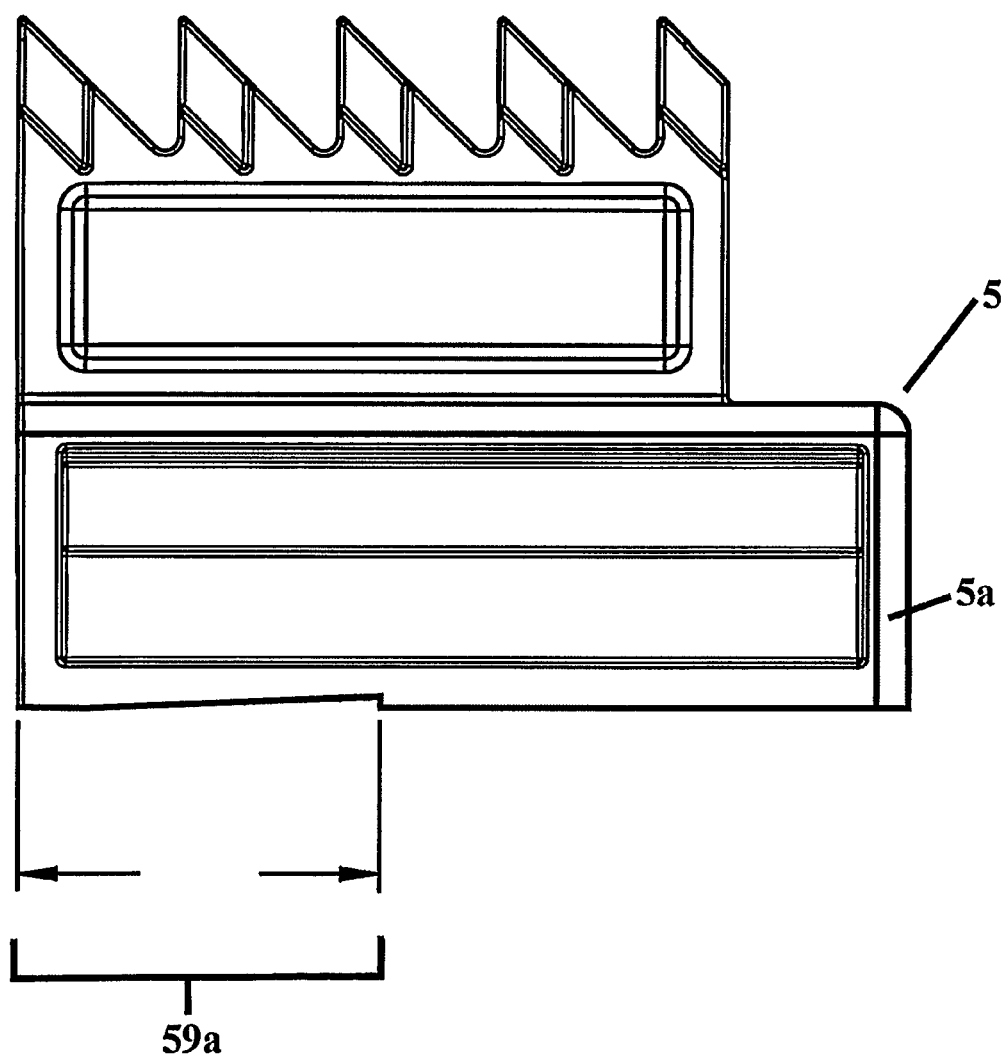
FIG. 2H is a side view of the filter key depicting an angled, ramp segment, which at least partially extends the length of the bottom surface of the filter key.
Figure 2I:
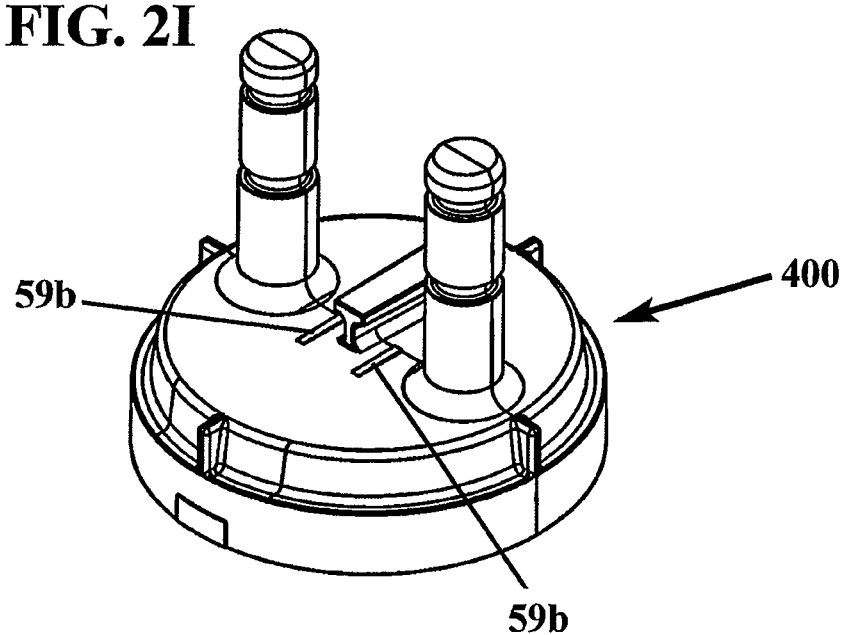
FIG. 2I depicts the complementary angled ramp segment for the filter key of FIG. 2H.
Figure 2J:
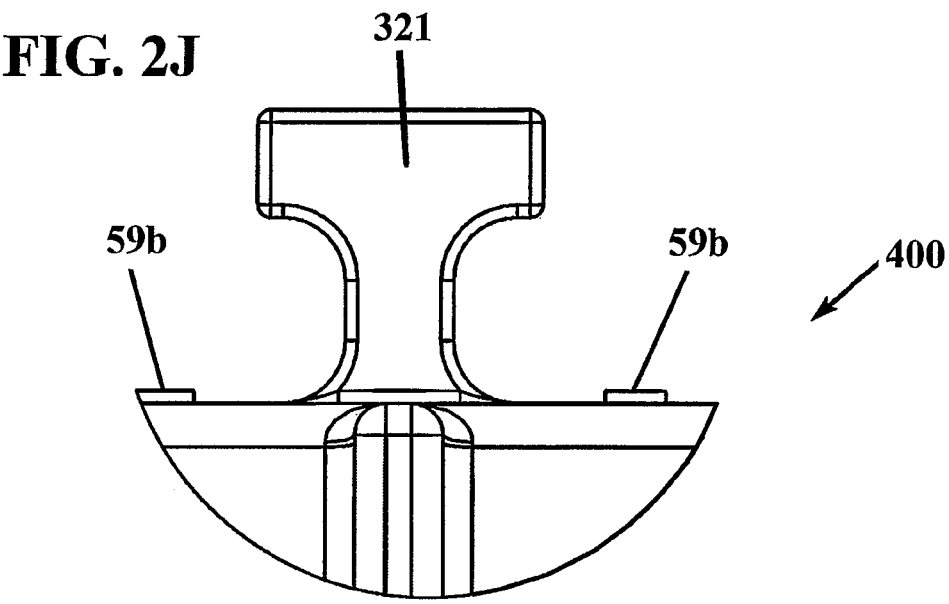
FIG. 2J depicts a side view of a partial section of the filter head showing a mating protrusion for interlocking with the slotted groove on the filter key, and complementary angled ramp segments for interlocking with the ramp segments on the filter key bottom edges.

Additionally, the filter keys 5, 5' may include an angled, ramp segment 59a on at least its bottom edges where the filter key slideably mates with the top surface of the adjoining structure, which in the axial port embodiment is with filter manifold 3 or filter head 400. FIG. 2H is a side view of a filter key depicting angled ramp segment 59a, which at least partially extends the length of the bottom surface of the filter key. Angled ramp 59a is located at one end of the bottom edges of the filter key and extends into the filter key main body 5a. FIG. 2I depicts a perspective view of filter head 400 with complementary angled ramp segments 59b for mating with angled ramp segments 59a of the filter key. Angled ramp segment 59a mateably adjoins complementary angled ramp segment 59b to interlock and assist in securing filter key 5 to filter head 400. For the two piece design utilizing filter manifold 3, complementary angled ramp segments 59b are formed on the top surface of filter manifold 3. FIG. 2J depicts a side view of a partial section of filter head 400 showing mating protrusion 321 for interlocking with slotted groove 51b, and complementary angled ramp segments 59b.

Figure 4A:
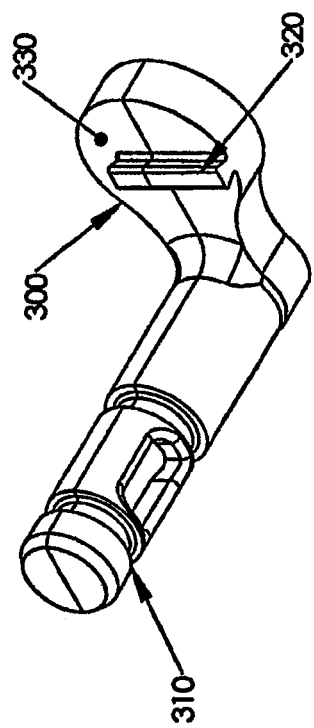
FIG. 4A is a perspective view of one embodiment of the filter manifold.
Figure 4C:
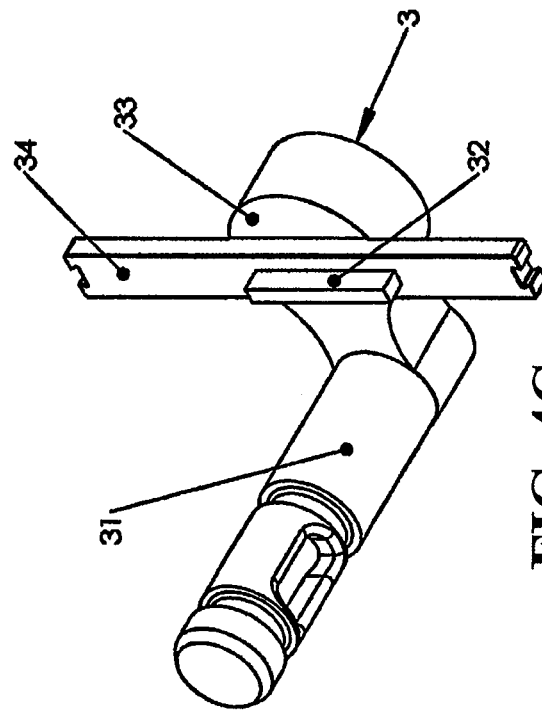
FIG. 4C is a perspective view of a second embodiment of the filter manifold.
Figure 4B:
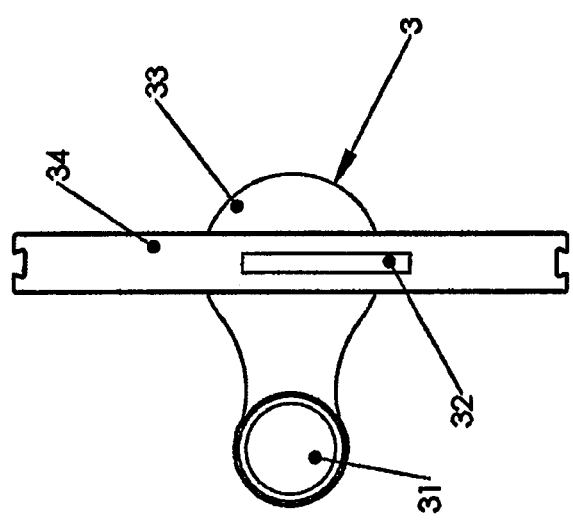
FIG. 4B is a top plan view of a second embodiment of the filter manifold with an extension support member.

For the axial port embodiment, FIG. 4A depicts a perspective view of filter manifold 300. Port 310 is shown off center of filter manifold 300. FIG. 4A depicts the filter manifold without extension support members. Preferably, port 310 is an outlet port; however, the present invention is not limited to a specific ingress and egress location, and may have these ports interchanged. When port 310 is used as an egress or outlet port, filter manifold 300 takes fluid from filter media 8 through the center port of open cap 6, and directs fluid flow radially outwards from the axial center to port 310. In this embodiment, the ingress port is located on filter head 2. By locating the ingress and egress ports off axis, filter housing assembly 200 has a more robust design, with enhanced structural integrity for mounting to the filter base, and for remaining fixably in place during attachment. Referring to FIGS. 4A-4C, in a preferred attachment scheme for filter key 5, a protrusion 32 or 320 is formed on or near the center line of filter manifold 3 or 300. Protrusion 32 or 320 is preferably a rectangular shaped segment extending above circular center portion 33 or 330. Protrusion 32 allows for precise alignment of filter key 5, while providing a robust connection. A dovetail shape, press fit, or friction fit interconnection between protrusion 32 and groove 51 of filter key 5 permits the user to remove and replace filter key 5. This allows for the designation of specific filter keys, and correspondingly, specific filter cartridges. Protrusion 32 or 320 may be integrally formed with filter manifold 3 or 300, respectively, or may be separately fabricated and attached by bond, weld, press fit, friction fit, or other suitable means known in the art. Preferably, protrusion 32 or 320 has a dovetail shaped surface for mating with complementary groove 51 of filter key 5.

In the embodiment depicted by FIGS. 4B and 4C, protrusion 32 may be on an extension support 34. FIG. 4B depicts a top level view of filter manifold 3, showing extension support 34 extending longitudinally or radially outward from center portion 33, along a radius. Extension support 34 supports optional shroud 4 that covers and protects filter head 2.

Filter manifold 3 or 300 seats within, and attaches to, filter head 2. FIG. 5A depicts a side view of the axial port embodiment of filter head 2. Filter head 2 is shown with off-center port 21. In this manner, port 21 of filter head 2 and port 31 of filter manifold 3 are both off-center and parallel to one another about a plane that approximately intersects the center point of filter head 2. As shown in FIGS. 1, 4, and 5, a recessed portion 22 formed about the center point of filter head 2 receives center portion 33 of filter manifold 3. If extension support 34 is used with filter manifold 3, when filter manifold 3 is inserted within filter head 2, extension support 34 is situated approximately perpendicular to the plane formed by ports 21 and 31. Extension support 34 provides at each end a snap fit design for shroud 4. FIG. 5B is a bottom perspective view of the filter head. FIG. 5C is a top perspective view of filter head 2 depicting recess portion 22.

Filter head 210 depicts another axial port embodiment as shown in FIGS. 5D-5F. In this embodiment, as depicted in the top perspective view of FIG. 5F, on the top surface of filter head 210 is a curved receiving boss or support member 230 located on one side of the center point, and two parallel, lateral support members 240a,b located opposite curved boss 230 on the other side of the center point of filter head 210. These structural support members are used to align filter key 5 to filter head 210, and help secure filter key 5. This filter head may be used in conjunction with the filter manifold 300 without extension supports, as depicted in FIG. 4A. Structural support member 230 provides a physical stop for filter key 5, which typically slides on protrusion 32 provided by filter manifold 300. Lateral support members 240a,b are used to align filter key 5, and prevent it from inadvertent shifting. FIG. 5E is a bottom perspective view of filter head 210. FIG. 5D is a side view of filter head 210.

Figure 5G:
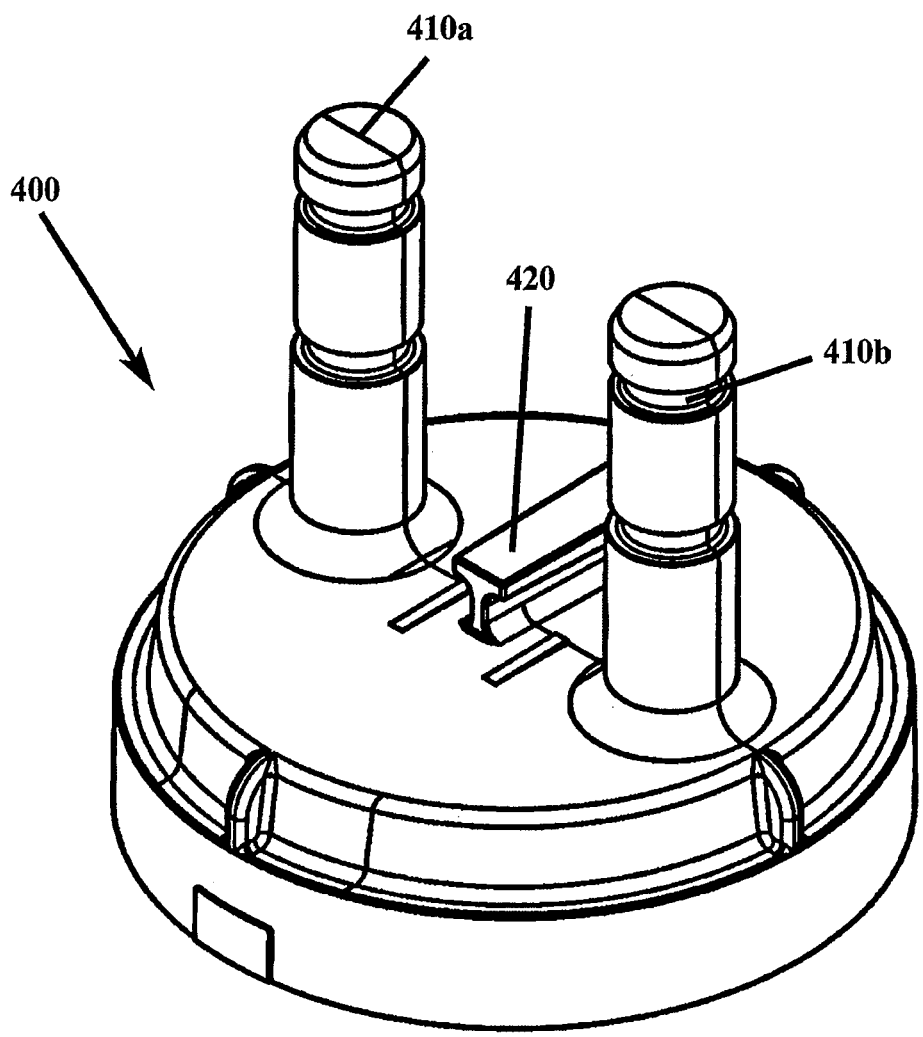
FIG. 5G depicts a one-piece or integrated filter head/filter manifold construction having ingress and egress ports for fluid flow.
Figure 5H:
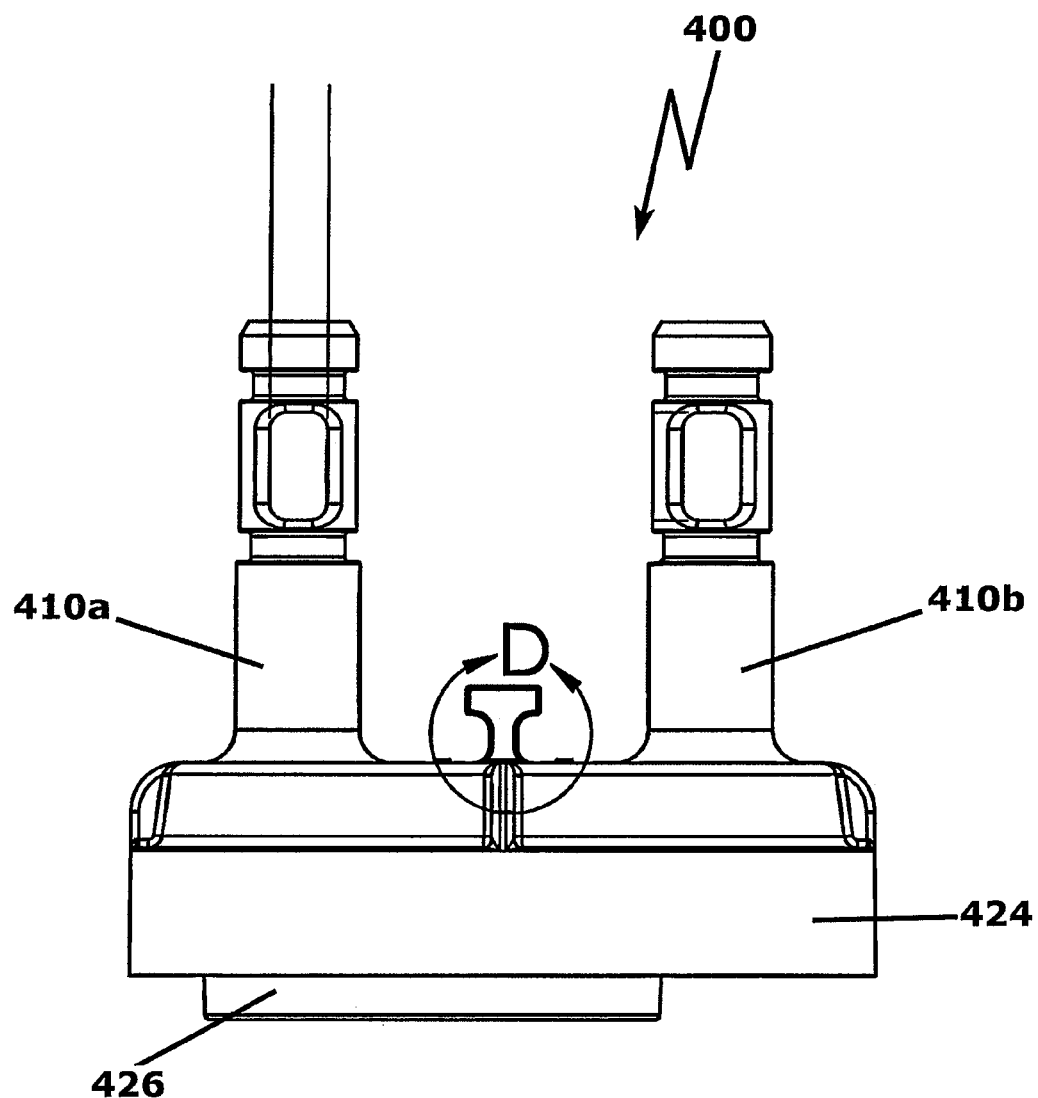
FIG. 5H is a side view of the integrated, one-piece filter head of FIG. 5G.
Figure 5I:
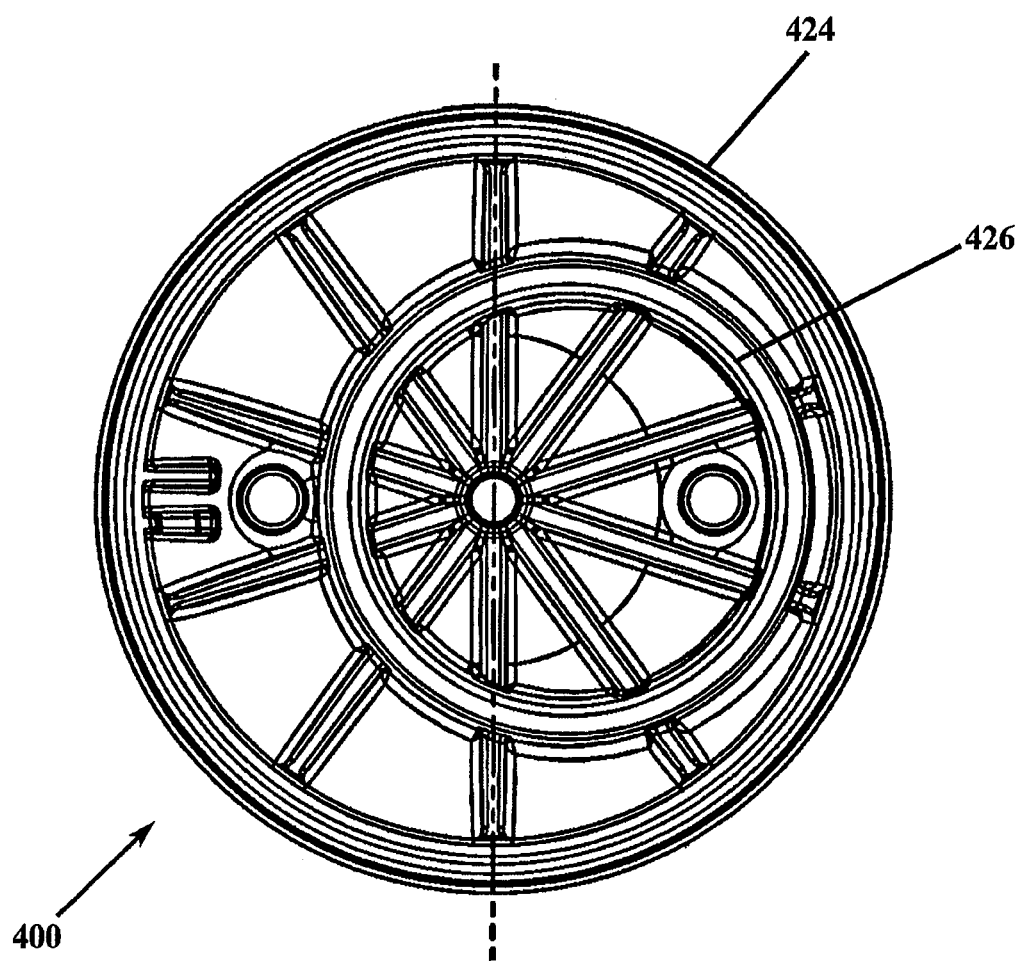
FIG. 5I is a bottom view of the integrated, one-piece filter head of FIG. 5G, depicting an off axial center cylinder for receiving an end cap port of the filter cartridge.

In another embodiment, filter head 2, 210 may be integral with filter manifold 3, 310, such as for example, a one piece construction in the form of a single injected molded piece, or a two piece construction with filter manifold 3, 310 welded, fused, or otherwise permanently attached to filter head 2, 210 as a subassembly. FIG. 5G depicts a one-piece or integrated filter head/filter manifold construction 400 having ingress and egress ports 410a,b. Protrusion 420 is preferably a shaped segment extending above, and off axis from, the circular center of filter head 400. Protrusion 420 allows for precise alignment of filter key 5, while providing a robust connection. A dovetail shape, press fit, or friction fit interconnection between protrusion 420 and groove 51 of filter key 5 permits the user to remove and replace filter key 5. FIG. 5H is a side view of integrated, one-piece filter head 400. Cylindrical wall 424 is sized to receive the open end cap 6 of filter housing 1. Cylindrical wall 426 is off the axial center of filter head 400 and is configured to receive the center axial port of end cap 6, redirecting fluid flow off the axial center such that port 410b is within cylinder 426, and port 410a is outside of cylinder 426. This redirection of fluid flow performs a similar function as filter manifold 3, 310 without the need of aligning the center axial port of end cap 6 with a filter manifold aperture. FIG. 5I is a bottom view of the integrated, one-piece filter head of FIG. 5G, depicting off axial center cylinder 426 for receiving a port of open end cap 6 of the filter cartridge. A comparison to FIGS. 5B and 5E which depict perspective views of the underside of filter head 2, 210 respectively, with FIG. 5I, demonstrates the absence of an axially centered cylinder for receiving the port from open end cap 6 in the integrated filter head 400 design.

Filter manifold 300 includes an off-center port 310, as well as a center portion 330 that fits securely within recess 220 of filter head 210. Protrusion 320 receives the groove from filter key 5. In this embodiment, when filter key 5 is slidably inserted within protrusion 320, structural support member 230 and lateral structural support members 240a,b secure filter key 5. The curved portion of structural support member 230 forces filter key 5 to be inserted in one direction only. An added boss 232, located on the top of filter head 210 and centered between lateral support members 240a,b may be employed to serve as a lock or snap fit for filter key 5. Additionally, in another embodiment, structural support member 230 may be formed with a small aperture 235 located directly away from the center point of filter head 210 at its base where support member 230 meets the top portion of filter head 210. This small aperture 235 is designed to receive a protruding material or locking nub or tab 53 placed at, or formed with, the corresponding end portion of filter key 5 on the lower end of a lateral side. Locking nub or tab 53 on filter key 5 is inserted within small aperture 235 on the curved portion of structural support member 230 and prevents axial removal of filter key 5 away from filter head 210. FIGS. 2A-2F show locking nub 53 located on the bottom portion of a lateral side of filter key 5. FIG. 5D is a side view of filter head 210 depicting aperture 235 for receiving filter key 5.

Filter keys 5, 5' are interchangeable, and include at least one laterally extending finger 52, and preferably a plurality of extending fingers, as depicted in FIGS. 2A-2F. FIG. 2C is a bottom perspective view of filter key 5, 5'. In a first illustrative embodiment, filter key 5 is shown with ten laterally extending fingers 52. Fingers 52 are preferably constructed of the same material as, and integrally formed with, base 55 of filter key 5. However, the fingers may also be removably attached, and the filter key design is not limited to an integrally formed construction. The laterally extending fingers 52 may form a number of different configurations. In the illustrative embodiment, there is a uniform gap 54 between each finger 52. In other configurations, a finger may be missing on one or both sides of filter key 5, and gap 54 may be wider in some places than in others. Using a digital 1, 0 designations to indicate a finger (1) or a gap (0), it is possible to have many different configurations for a filter key. The configuration as shown in FIG. 2E would be designated on each side as 101010101. As a separate example, for a designation of 100010101, this would represent a lateral finger (1) followed by a wide gap (000), and then a finger (1) followed by a gap (0) and a finger (1) followed by another gap (0), and one last finger (1). The present invention is not limited to any particular finger/gap order. Additionally, it is not necessary for the finger/gap configuration on one side of filter key 5 to be symmetric with the finger/gap configuration on the opposite side. By having different finger/gap configurations, it is possible to make a mechanical key identifier for the specific filter housing assembly being employed. Filter keys 5, 5' may also be color-coded to facilitate identification for different filter cartridges or housing assemblies. It may also be textured, mirrored, transparent, translucent, materially modified, or having a conductively signature, or any combination thereof, for identification purposes. More importantly, aside from identification of the filter housing assembly, a particular filter key finger/gap configuration will only allow for the use of a specific filter housing assembly in a given system.

Fingers 52 of the filter key are strength bearing members, used to mate with, or interlock with, corresponding drive keys 123a,b located on longitudinal sides of floating lock 12 as depicted in FIG. 3. There must be at least one drive key on floating lock 12, 12' that corresponds to, and lines up with, at least one finger on the filter key, so that when the filter key is inserted to mate with floating lock 12, 12', the drive keys slidably contact the fingers and the floating lock is shifted longitudinally an incremental amount to allow fingers 52 on the filter key to traverse between the gaps 122 on the floating lock. Once fingers 52 have passed between the corresponding gaps on the floating lock, which is slidably restrained under tensional forces, the floating lock is partially returned towards its original position by the tensional retraction forces so that at least one finger on the filter key aligns or interlocks with at least one drive key on the floating lock, and the alignment resists any direct outward, axial extraction forces.

Each finger 52 of filter key 5 includes a slanted face 58 as depicted in FIGS. 2A and 2F. These angled features are made to slidably contact complementary slanted edge or angled features 121a,b of drive keys 123a,b of floating lock 12 shown in FIGS. 3A and 3E. During insertion of filter key 5, the sliding contact of the angled feature of the filter key's fingers transversely shifts floating lock 12 off of its initial position, and allows the fingers of filter key 5 to be inserted within gaps 122 between the drive keys 123a,b.

A perspective view of the floating lock 12 is depicted in FIGS. 3A and 3B. This view is also applicable to the floating lock used for the radial port embodiment. Floating lock 12 has angled-faced fingers, protrusions, or drive keys 123a,b and gaps 122 that may reciprocally correspond to fingers 52 and gaps 54 located on the filter key 5, 5'. It is not necessary for the drive key/gap configuration of floating lock 12 to be exactly complementary to the finger/gap configuration of filter key 5. It is only necessary that floating lock 12 is able to fully receive the inserting filter key 5 when filter housing assembly 200 is axially inserted into filter base 100. Each drive key 123a,b of floating lock 12 is shaped with a receiving wedge 129a,b, respectively, opposite slanted edge 121a,b to capture fingers 52 of filter key 5. Fingers 52 may have a cross-sectional diamond shape to facilitate the capture by the drive key receiving wedge 129a,b. Drive keys 123a,b are placed on at least one longitudinal side of floating lock 12, as depicted in FIGS. 3D and 3E. Underneath and centered between drive keys 123a,b is a row of position stops 125. Position stops 125 preclude fingers 52 from extending any further during insertion. There need not be a position stop 125 for each drive key 123a,b, provided there is at least one position stop 125 to prohibit over insertion of filter key 5. Position stops 125 also include a slanted or angled face 126 for slidable contact with slanted face 58 of fingers 52 on filter key 5. Position stops 125 are shown as a row of jagged edges, but do not have to correspond one-for-one with drive keys 123a,b.

Upon insertion, when fingers 52 of filter key 5 contact drive keys 123a,b, floating lock 12 shifts away from its initial position, against retraction forces, and moves according to the contacting angled edges 58 and 121. Once wings 56a,b of fingers 52 clear lip 127a,b of drive keys 123a,b, floating lock 12 is not prohibited from reacting to the retraction forces, and moves slightly back, towards its original position where diamond shaped wings 56a,b are then trapped by receiving wedges 129a,b. This position locks filter key 5 to floating lock 12 resisting any direct axial extraction force.

There is a gap or space 124 between the bottom most portion of drive key 123a,b and top most portion of position stop 125. Upon extraction, when wings 56a,b of fingers 52 are pushed within this gap or space, there is no structure preventing floating lock 12 from responding to the tensional retraction forces acting on it. Thus, floating lock 12 is free to respond to the retraction forces, and will tend to move towards its initial position. This will align fingers 52 of filter key 5 within gaps 122 of floating lock 12 and allow for easy extraction of filter housing 200.

In order to extract filter housing assembly 200, a user again pushes axially inwards on the filter housing assembly, which releases wings 56a,b on filter key 5 from drive keys 123a,b. This frees floating lock 12 to return towards its original position, and locates fingers 52 on filter key 5 at gaps 122 of floating lock 12. Filter housing assembly 200 can now be freely extracted from filter base 100. Resilient members 1110 within shut-off stanchions 1101a,b of non-floating port 11 assist in pushing or extracting filter housing assembly 200 away from filter base 100.

Figure 9B:
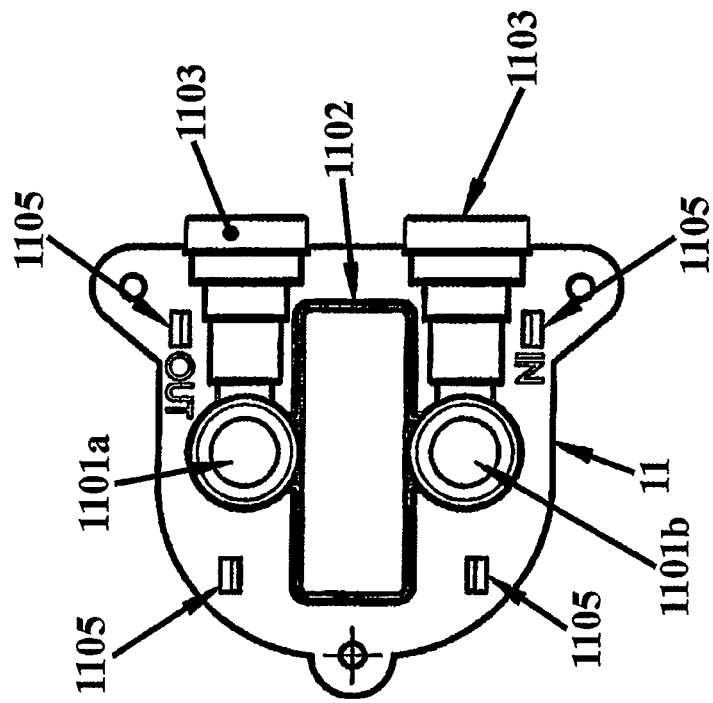
FIG. 9B is a top plan view of the non-floating port of FIG. 9A.
Figure 9A:
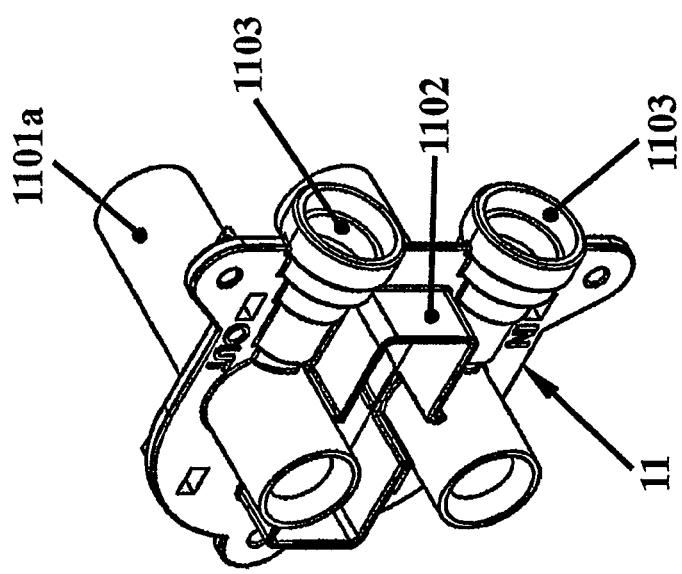
FIG. 9A is a perspective view of a non-floating port of the present invention.

FIG. 9A is a perspective view of non-floating port 11, which works in tandem with rear plate 13 or rear plate 1300 to hold floating or sliding lock 12 in place while allowing it to freely move longitudinally off its center position and back to its center position during the insertion and extraction of filter housing assembly 200. Similarly, FIG. 12C depicts a perspective view of the non-floating port working in tandem with rear plate 13' for the radial port embodiment. As discussed further herein, non-floating port 11 will also hold floating lock 1200 and floating lock 1212 of FIG. 8. For simplicity, reference is made chiefly to the interaction of non-floating port 11 with floating lock 12, although the applicability of non-floating port 11 includes usage with floating lock 1200 and 1212 as well. Non-floating port 11 includes a protruding encasement 1102, larger than floating lock 12, and made to enclose floating lock 12 therein. Encasement 1102 prevents over-travel of floating lock 12, and protects it when installed from extraneous, unintended movement. FIG. 9B is a top plan view of non-floating port 11. Stanchions 1101a,b are located on opposite sides of encasement 1102. Similarly, stanchions 1101a', b' are located on opposite sides of encasement 1102' of the radial port embodiment of FIG. 12C.

Ports 1103 represent the ingress and egress ports for the fluid. Shut-off stanchions 1101a,b include shutoff plugs 14, which act as valve seals to stop fluid flow when the filter cartridge is being removed. Shut-off stanchions 1101a,b are preferably cylindrical in shape, containing spring activated, O-ring sealed plugs for sealing the ingress and egress lines during filter cartridge removal. In a preferred embodiment, rear plate 13 is snap fitted into non-floating port 11. In order to accommodate this, snap fittings 1105 are shown on non-floating port 11 that receive a corresponding fitting 135 on rear plate 13.

Figure 10B:
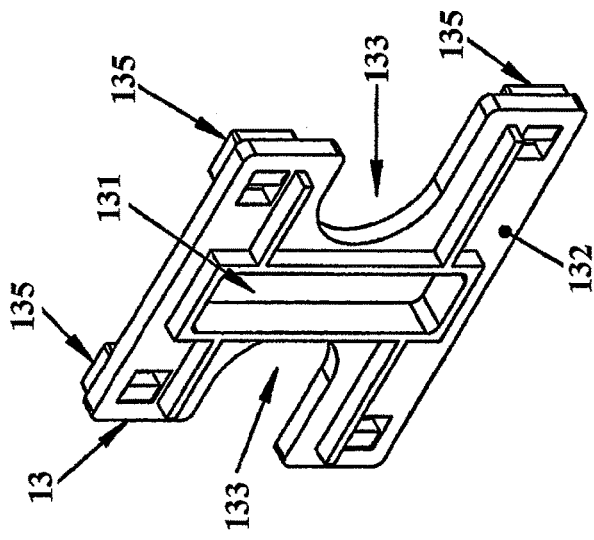
FIG. 10B is a bottom perspective view of the rear plate of FIG. 10A.

Referring to FIG. 1, floating lock 12 is supported by non-floating port 11 and rear plate 13. FIG. 10A is a top plan view of one embodiment of rear plate 13 of the present invention. FIG. 10B depicts a bottom perspective view of rear plate 13. Rear plate 13 secures floating lock 12 within a support structure in non-floating port 11. Rear plate 13 is preferably attached by snap fit to non-floating port 11, although other attachment schemes known in the art may be easily employed, such as bonding, welding, and assorted mechanical fasteners. In FIG. 12C, rear plate 13' is depicted as a snap fit attachment. Rear plate 13 is formed with extensions 132 on each end, and shaped gaps 133 therebetween. In the radial port embodiment, rear plate 13' includes one extension 132', and a snap fit aperture at the opposite end. Gaps 133 are shaped to go around shut-off stanchions 1101a,b of non-floating port 11, or in the case of the radial port embodiment, the width of the center aperture 131' is such that it fits between stanchions 1101a',b'. In both embodiments, rear plate 13, 13' includes a center aperture 131, 131' respectively that allows for longitudinal movement of floating lock 12. Floating lock 12 may include an extension member opposite the face configured with fingers and gaps, in order to permit resilient components, such as helical or torsion springs to act upon it. FIGS. 3C and 3E are side views of the floating lock showing extension member 128. FIG. 3B is a perspective view of the floating lock 12 with extension member 128. FIG. 8E depicts floating lock 1212 with extension member 1280. In these embodiments, the extension member is acted upon by resilient devices held by the rear plate.

Figure 10C:
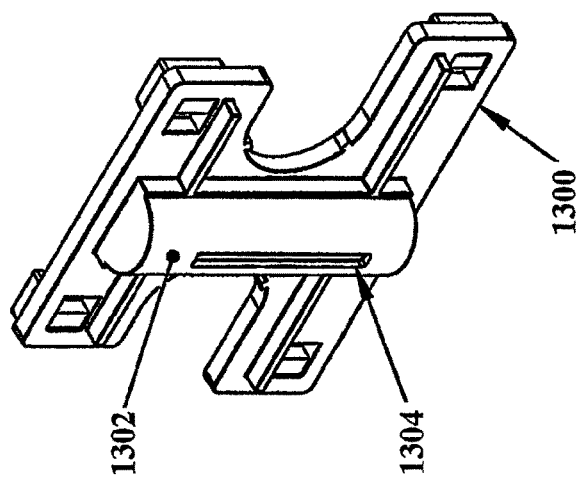
FIG. 10C is a top plan view of a second embodiment of the rear plate of the present invention.
Figure 10A:
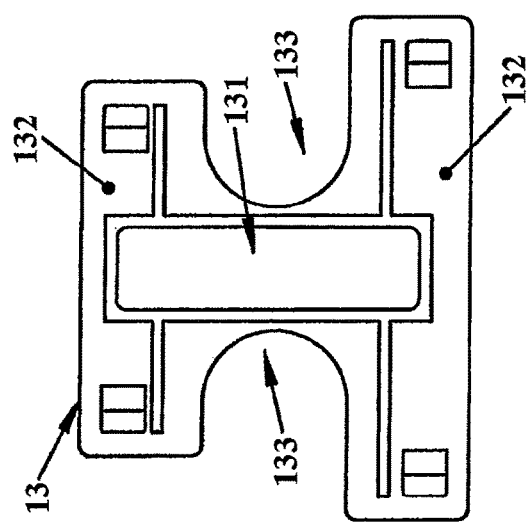
FIG. 10A is a top plan view of one embodiment of the rear plate of the present invention.
Figure 11:
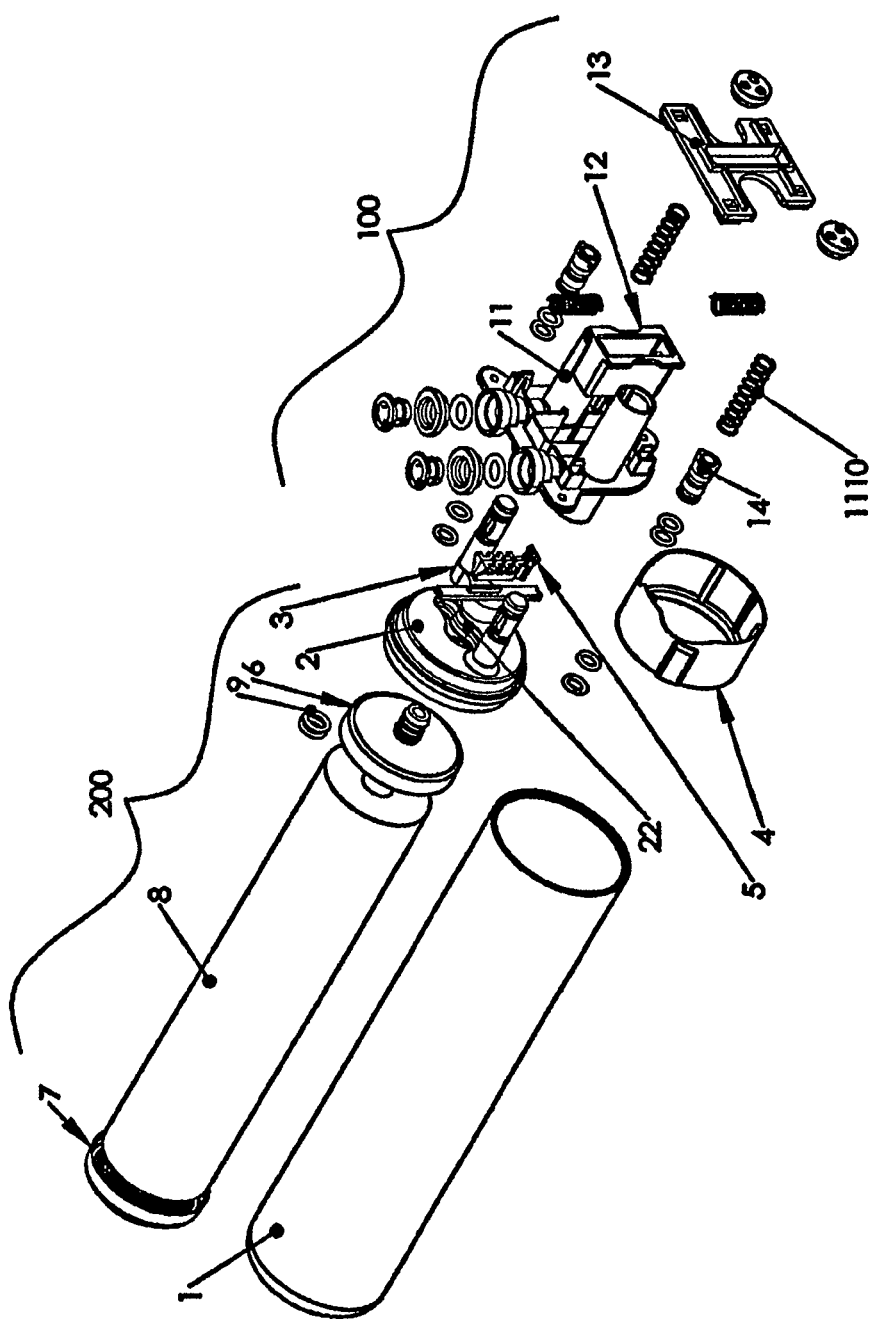
FIG. 11 is an exploded view of a filter assembly of the present invention, showing a filter key having a boss, connected to a filter manifold having extension supports.

FIG. 10C is a top plan view of another embodiment of the rear plate 1300 of the present invention. In this embodiment, the topside of rear plate 1300 includes a domed, slotted cover 1302 over the center aperture. Cover 1302 is formed to encase springs or other resilient members about the extension member 128 extending from floating lock 12. Dome 1302 includes a slot 1304 that is made to receive the extension member 128 from floating lock 12. Slot 1304 helps retain linear movement of floating lock 12 inside dome 1302. In this embodiment, two complementary resilient members, such as springs, would reside on each side of the extension member 128 of floating lock 12. A dome is also introduced in the radial port embodiment as shown in FIG. 12C.

One resilient member preferably applies force on the floating lock extension member in one direction, while the other resilient member applies force to the floating lock extension member in the opposite direction. In this manner, no matter which way floating lock 12 is moved or shifted, a retraction force presents itself to return floating lock 12 to its original, centered position.

At all times during insertion, the filter housing assembly is under extraction forces that tend to push the housing out of the filter base. These extraction forces result from resilient members in each shut-off stanchion 1101a,b, 1101a',b' of non-floating port 11 (shown for example in FIG. 9B) that force shutoff plugs 14 into position in order to block the ingress and egress ports. Preferably, the extraction forces on shutoff plugs 14 are provided by a spring 1110 in each port, although other resilient members may be used to provide a similar result. Inserting the filter housing assembly into the filter base works against these extraction forces, and pushes shutoff plugs 14 further up each shut-off stanchion 1101a,b of non-floating port 11. This allows for fluid ingress, while keeping the filter housing assembly under the constant extraction force.

Protective port shroud 4 may be placed over filter head 2, to protect the floating lock 12 and filter key 5 mechanism from damage and debris. Shroud 4 is preferably supported by the extension supports on the filter manifold.

Figures 6A, 6B:
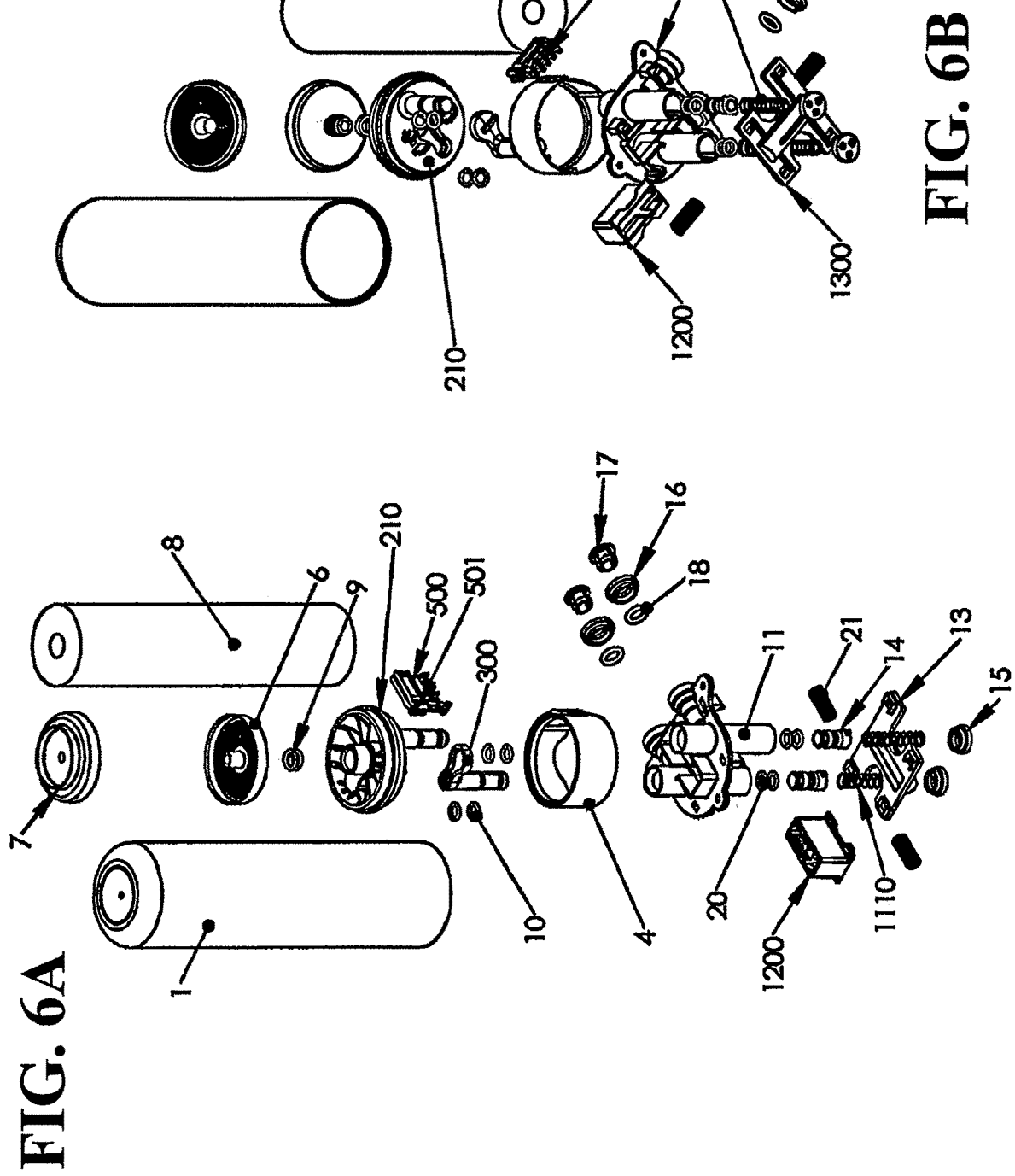
FIGS. 6A and 6B are exploded views of a second embodiment of the filter assembly of the present invention, showing a filter key having an extended boss.
Figure 7A:
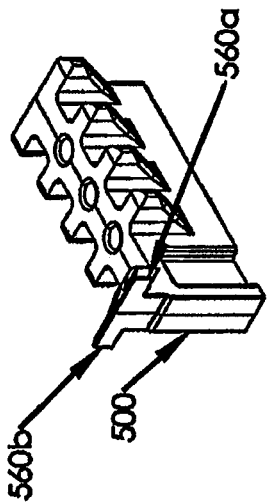
FIG. 7A is a top perspective view of an embodiment of the filter key of the present invention having an extended boss.
Figure 7B:
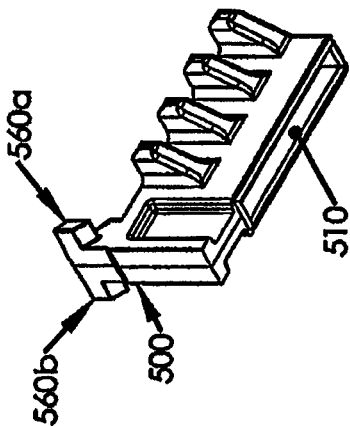
FIG. 7B is a bottom perspective view of the filter key of FIG. 7A.
Figure 7C:
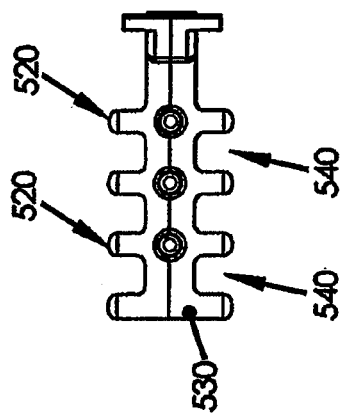
FIG. 7C depicts a top plan view of the filter key of FIG. 7A.
Figure 7E:
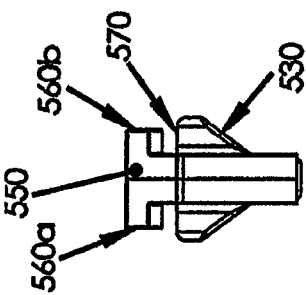
FIG. 7E depicts an end or lateral side view of the embodiment of the filter key of FIG. 7A, showing the boss rising above the plane created by the fingers, and two wings extending laterally outwards from the boss.
Figure 7F:
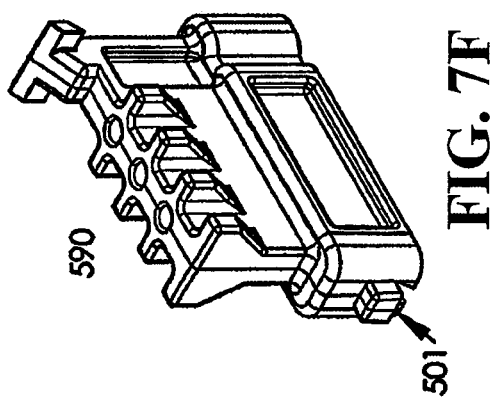
FIG. 7F is a perspective view of another embodiment of the filter key of the present invention showing a locking nub located on the bottom portion on a lateral side.
Figure 7D:
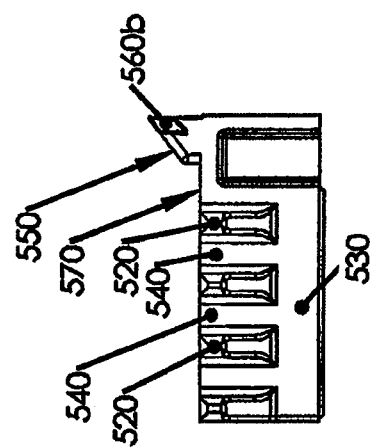
FIG. 7D depicts a side plan view of the filter key of FIG. 7A.

FIGS. 6A and 6B are exploded views of another embodiment of the filter assembly of the present invention, showing the combination of filter manifold 300, filter key 500, and filter head 210. Filter key 500 is depicted without a locking nub or tab; however it may include a locking nub to facilitate attachment to the filter head. FIG. 7F depicts filter key 590 with locking nub or tab 501. Locking nub 501 is located at the base of filter key 590. In this embodiment, filter key 500 or 590 and filter manifold 300 are modified such that floating lock 1200 or 1212 of FIG. 8 is slidably shifted by the interaction wings 560a,b of an extended boss 550 on filter key 500 or 590 with drive keys 1210a,b of floating lock 1200.

Filter key 500 or 590 is inserted within floating lock 1200 through the axial insertion of the filter housing assembly into the filter base. Hammerhead shaped wings 560a,b on fingers 520 of filter key 500 and drive keys 1210a,b on floating lock 1200 or 1212 slidably contact one another, causing a transverse motion of floating lock 1200 or 1212 perpendicular to the axial motion of insertion. In this manner, floating lock 1200 or 1212 is shifted longitudinally, in a direction radially relative to the filter housing assembly axis. Fingers 520 of filter key 500 are positioned within the gaps 1220 on floating lock 1200 or 1212. Once filter key 500 or 590 is inserted, floating lock 1200 or 1212 is returned partially towards its original position by retracting tensional forces, preferably by complementary spring forces, so that the fingers on floating lock 1200 or 1212 align directly with fingers 520 on filter key 500 or 590, thus preventing a direct extraction force from removing the filter housing assembly from the filter base.

FIG. 7F depicts a top perspective view of filter key 590. At one end of filter key 590 is an upwardly extended angled boss 550. Boss 550 rises above horizontal plane 570 created by the top portion of fingers 520, and is angled toward fingers 520, with its highest point at one end of filter key 500. Boss 550 angles downward from its highest point towards fingers 520. Preferably, boss 550 is an upwardly facing triangular or wedge shaped design having wings 560a,b for interaction with drive keys 1210a,b, respectively, on floating lock 1200. FIG. 7E depicts an end view of filter key 500 showing a hammerhead shaped boss 550 rising above plane 570 created by fingers 520, and wings 560a,b extending laterally from boss 550 resembling what may be considered a hammerhead shape. The purpose of wings 560a,b is to contact corresponding angled drive keys 1210a,b on floating key 1200.

A perspective view of the complementary floating lock 1200 is depicted in FIG. 8A. The only difference between floating lock 1200 of FIG. 8A and floating lock 1212 of FIG. 8E is the addition of an extension member 1280 on floating lock 1212. Floating lock 1200 has fingers 1230a,b and gaps 1220 that may reciprocally correspond to fingers 520 and gaps 540 located on filter key 500 or 590. It is not necessary for the finger/gap configuration of floating lock 1200 to be exactly complementary to the finger/gap configuration of filter key 500 or 590. It is only necessary that floating lock 1200 is able to fully receive the inserting filter key 500 when the filter housing assembly is axially inserted into the filter base. Furthermore, once floating lock 1200 is subjected to retraction forces acting to return it partially towards its original position, it is necessary that at least one finger on filter key 500 or 590 vertically align with at least one finger on floating lock 1200 or 1212 preventing any extraction without further shifting of floating lock 1200 or 1212.

Using floating lock 1200 and filter key 500 as illustrative examples, upon slidable contact of wings 560a,b on filter key 500 and drive keys 1210a,b on floating lock 1200, floating lock 1200 moves in a transverse motion, perpendicular to the motion of insertion. In this manner, floating lock 1200 is shifted either longitudinally, in a direction radially relative to the filter housing assembly axis, or radially, in a direction longitudinally relative to the filter housing assembly radius. Fingers 520 of filter key 500 are positioned within the gaps 1220 on floating lock 1200. Once filter key 500 is inserted, floating lock 1200 is returned partially towards its original position by retracting tensional forces, preferably by complementary spring forces, so that the fingers on floating lock 1200 align directly with fingers 520 on filter key 500, thus preventing a direct extraction force from removing the filter housing assembly from the filter base.

Fingers 1230a,b are preferably constructed of the same material as floating lock 1200 and integrally formed therewith. However, fingers 1230 may also be removably attached, and the floating lock design is not limited to an integrally formed construction. Additionally, the present invention is not limited to any particular finger/gap order. It is not necessary for the finger/gap configuration on one side of floating lock 1200 to be symmetric with the finger/gap configuration on the opposite side. Floating lock 1200 is responsive to tensional forces, such as complementary springs acting on it from two separate directions to provide resistance longitudinally. Floating lock 1200 effectively moves longitudinally when acted upon by filter key 500, and is forced to return partially towards its original position after fingers 520 of filter key 500 have traversed through gaps 1220. Upon partial retraction, fingers 520 are aligned behind or underneath fingers 1230 of floating lock 1200. FIG. 8B is a top view of floating lock 1200 showing laterally extending fingers 1230a,b and adjacent gaps 1220 between the fingers.

FIG. 8C is a cross-sectional view of floating lock 1200, depicting drive key 1210a, which is located at one end of floating lock 1200 on longitudinal or side panel 1240. Drive key 1210a is opposite a similar drive key 1210b (not shown), which is located on the opposite longitudinal panel of floating lock 1200. Both drive keys are designed to have an angled face for slidably interacting with wings 60a,b of boss 550 on filter key 500. Each drive key is preferably integrally fabricated with floating lock 1200; however, the drive keys may be fabricated separately and attached to the longitudinal panels of floating lock 1200 by attachment means known in the art. As shown in FIG. 8C, below drive key 210a is a position key or physical stop 1250, preferably formed with the supporting lateral wall 1260 of floating lock 1200. As shown in FIG. 8B, position key 1250 is situated between drive keys 1210a,b. Position key 1250 may be integrally formed with lateral wall 1260, or may be separately attached thereto by any acceptable means in the prior art, such as bonding, welding, gluing, press fitting, and the like. Position key 1250 acts as a physical stop to ensure against over travel of floating lock 1200. Position key 1250 is situated below drive keys 1210a,b by a distance designed to accommodate the insertion of boss 550 of filter key 500. Upon insertion of filter key 500 into floating lock 1200, boss 550 traverses through gap 1270 in floating lock 1200 formed by the space between drive keys 1210a,b. Wings 560a,b of boss 550 extend outward relative to the width of boss 550, traversing between lateral wall 1260 and drive keys 1210a,b. In this manner, wings 560a,b retain floating lock 1200 from retracting back to its original position while boss 550 is being inserted. At all times, floating lock 1200 is under the retraction force of resilient members, such as tandem springs, or the like, tending to keep floating lock 1200 its original position, which is preferably a centered position. During insertion of filter key 500, wings 560a,b interact with drive keys 1210a,b to shift floating lock 1200 longitudinally off-center while under the resilient retraction forces. Upon full insertion, when boss 550 reaches and contacts position key 1250, wings 560a,b are no longer held by drive keys 1210a,b because the length of drive keys 1210a,b is shorter than the length of boss 550. At this point in the insertion process, the tensional retraction forces shift floating lock 1200 towards its original position.

Once wings 560a,b reach position key 1250, and the user releases the insertion force initially applied on the filter housing assembly, the extraction forces from shutoff plug springs 1110 dominate. These forces push the filter housing assembly axially outwards, away from floating lock 1200. Since wings 560a,b are no longer bound between drive keys 1210a,b and lateral wall 1260, floating lock 1200 will tend to shift longitudinally, partially towards its original position as filter key 500 moves slightly axially outwards. At this point, wings 560a,b interact with edge angles 1280a,b to push away from the center position, shifting filter key 500, and combining or contacting with face 1300a,b to keep the filter housing from retracting. FIG. 8D depicts an exploded view of drive key 1210a with edge angle 1290a and face 1300a.

Fingers 520 of filter key 500 are now aligned with fingers 1230 of floating lock 1200 and remain in contact in a vertical plane in the axial direction, prohibiting extraction of the filter housing assembly from the filter base.

Figure 13:
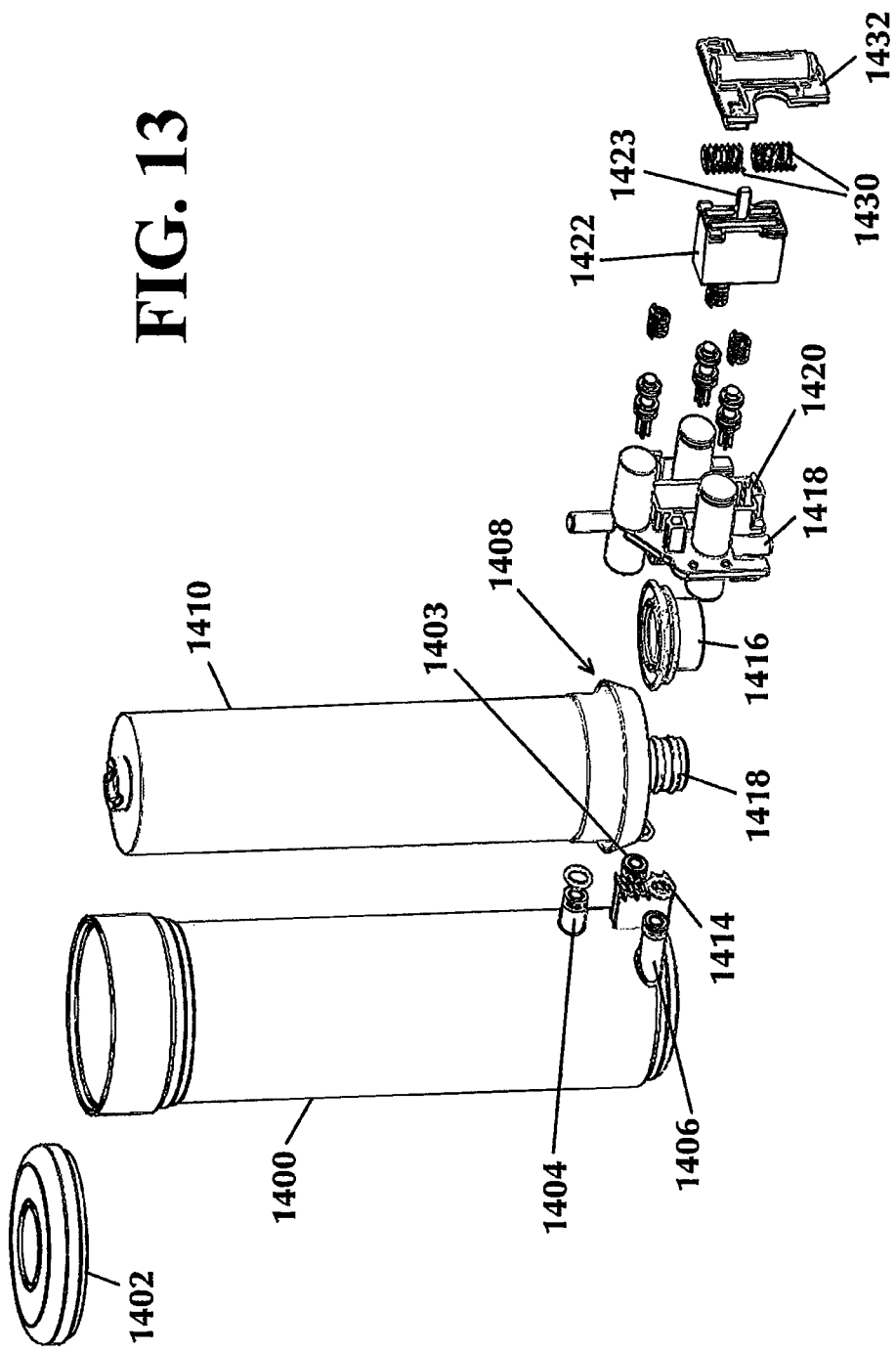
FIG. 13 depicts an exploded view of a reverse osmosis filter cartridge with a radial push-push attachment scheme.

FIG. 13 depicts an exploded view of a reverse osmosis filter cartridge with a radial push-push attachment scheme. Reverse osmosis filter cartridge sump 1400 is a housing used to encompass the RO membrane 1410. Sump or housing 1400 includes the three necessary ports for an RO system, namely a raw water inlet port 1404, a permeate water output port 1406, and a reject water port 1408. The RO membrane 1410 is secured within housing 1400 by sump cap 1402. RO membrane 1410 is sealed with a brine seal 1412 to assist in proper water flow within sump 1400 and about the membrane.

Adapter 1416 is attached to axial port 1418 of RO membrane 1410. Filter key 1414 is secured to the outside of sump 1400. In this embodiment, filter key 1414 is directed radially outwards from the sump wall. It is also possible for the filter key to be located on the top of sump 1400 for an axial insertion of the filter cartridge, rather than the radial insertion scheme depicted. Filter key 1414 may be slidably attached to an elongated strut located on the sump housing wall, or may be snap or friction fitted to the sump housing wall by known attachment schemes.

Figure 14:
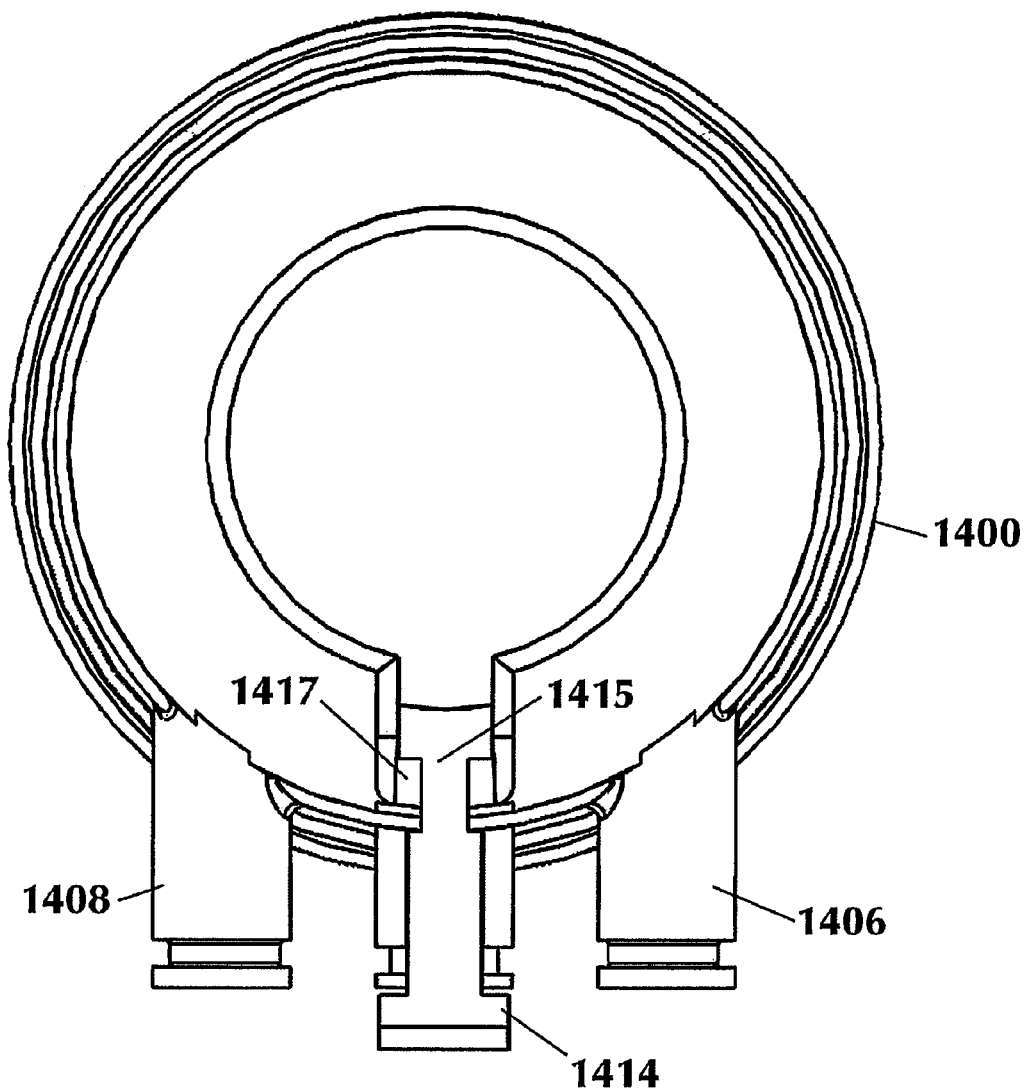
FIG. 14 is a cross-sectional view of the reverse osmosis filter cartridge with radial push-push attachment scheme of FIG. 13, depicting water flow.

FIG. 14 is a top view of the RO filter housing of the instant embodiment. In an illustrious example, filter key 1414 is shown slidably attached by a T-shaped leg 1415 into slot 1417. It is also possible for the sump 1400 to have an elongated strut protruding or extending (in this example) radially outwards for filter key 1414 to slidably attach thereto.

Figure 15:
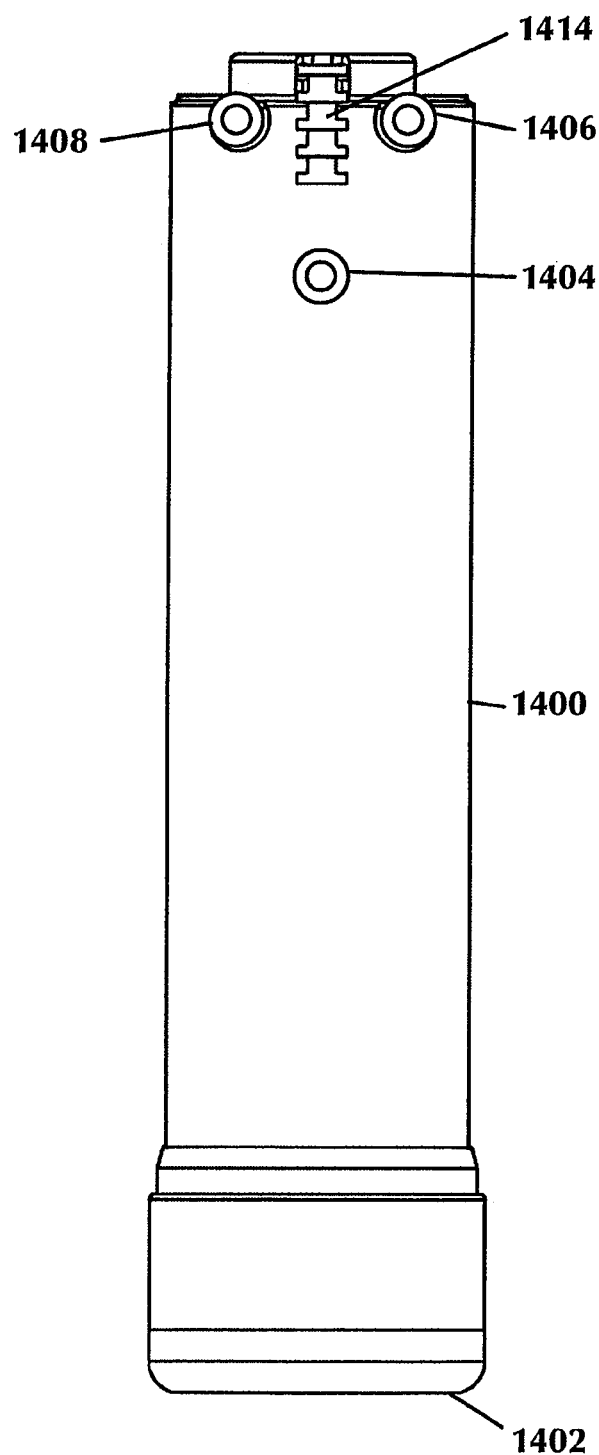
FIG. 15 is a bottom perspective view of the reverse osmosis filter cartridge with radial push-push attachment scheme of FIG. 13.

FIG. 15 depicts a front view of the RO filter cartridge of the instant embodiment. Placement of the three water ports are readily shown. Filter key 1414 is centered between permeate water output port 1406 and reject water port 1408. Raw water port 1404 is centered below filter key 1414.

Referring to FIG. 13, base 1418 is shown with three receiving ports 1424, 1426, and 1428 to complementarily mate with raw water port 1404, permeate water output 1406, and reject water port 1408, respectively. The receiving ports are made to receive O-rings on the cartridge water ports for making a water-tight seal. When sump 1400 with filter key 1414 attached is pushed in the radial direction with the water ports aligned within the base 1418 receiving ports 14244, 1426, and 1428 respectively, filter key 1414 locks into floating lock 1422, which is located within floating port 1420. Floating lock or sliding lock 1420 is responsive to the radial insertion force from the filter cartridge (for embodiments having water ports extending radially from the filter cartridge), moves in the first instance, in the axial direction parallel to the filter cartridge axis, and allows the specific filter key 1414 to insert within the floating lock 1422. Once inserted, the floating lock 1422 retracts within floating port 1420 on base 1418, towards its original position under a resilient force, such as two springs 1430 in tandem, or other complementary resilient mechanism keeping the floating lock 1422 under retraction tension when moved from its initial position. The filter key 1414 and floating lock 1422 combination allows for the identification of specific filter models and may be configured to reject all but specific filter types.

Base cover 1432 secures resilient springs 1430 about an extended post 1423 on floating lock 1422, and simultaneously secures floating lock 1422 within floating port 1420 of base 1418.

Figure 16:
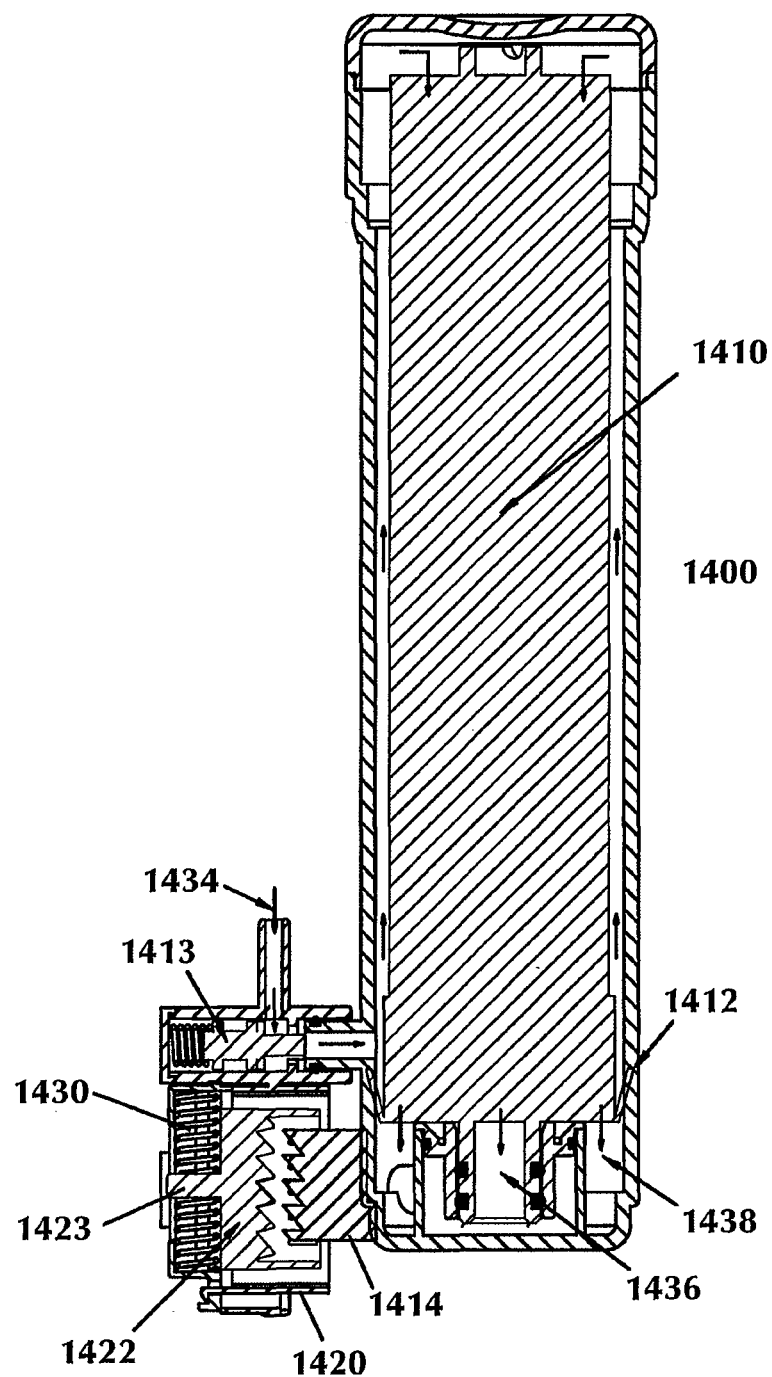
FIG. 16 depicts a cross-sectional view of the reverse osmosis filter cartridge system indicating the direction of water flow.
Figure 13:
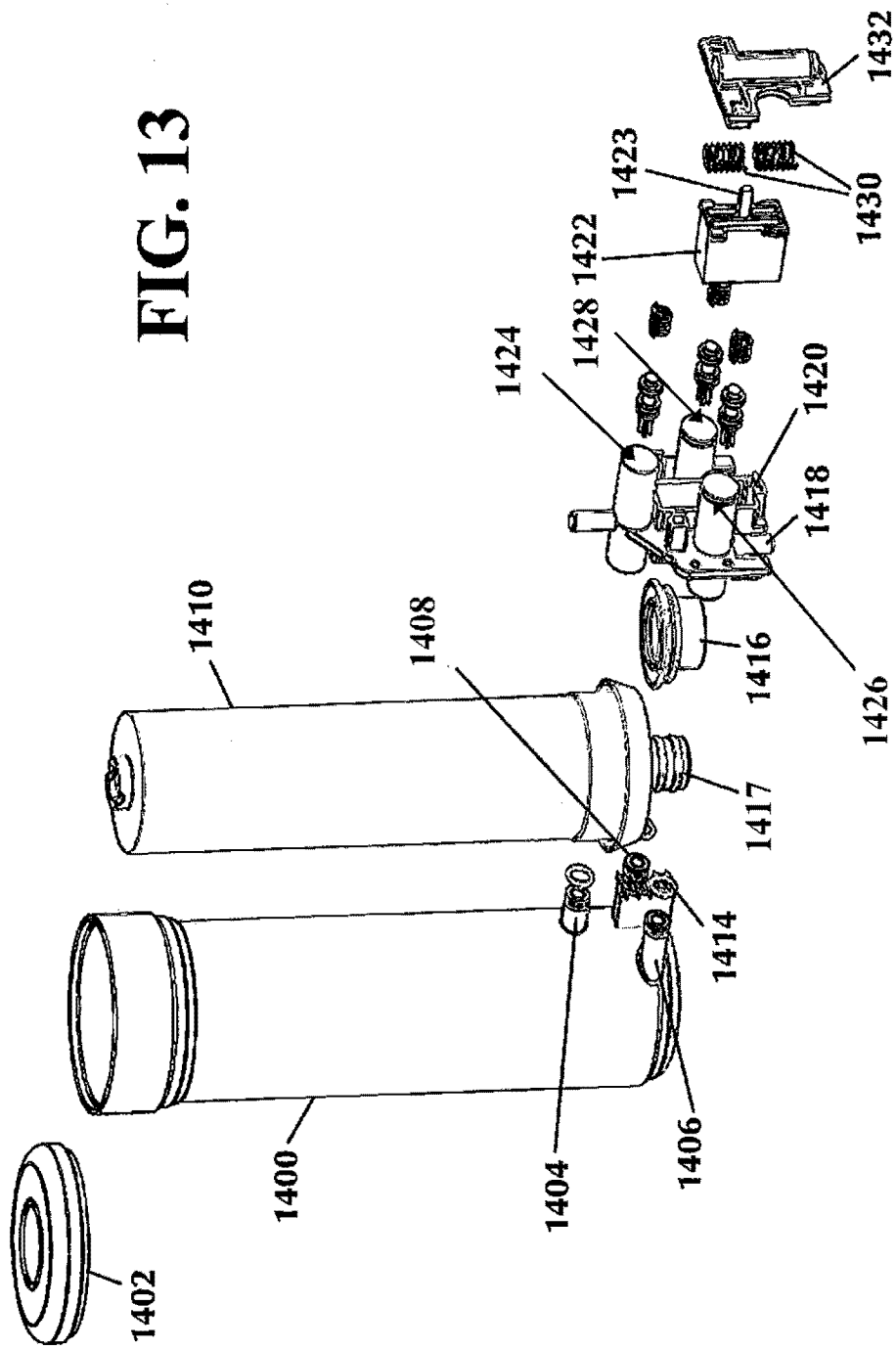

FIG. 16 depicts a cross-sectional view of the reverse osmosis filter cartridge system indicating the direction of water flow. Raw water inlet 1434 is in fluid communication with port 1404 on sump 1400. The permeate water flow 1436 is physically separated from reject water flow 1438 and raw water inlet 1434, such that the filtered, permeate water is isolated after filtering.

It is envisioned that the preferred embodiment of the reverse osmosis system of the present invention would be disposed in a location where quick access and replacement of the filter cartridge is a high concern. Using the radial port attachment scheme embodiment as an example, the output of the filter assembly may be selectively coupled to a water dispenser or water storage device. The water source would be in fluid communication with the raw water inlet of base 1418, and prohibited from flowing when sump housing 1400 is removed from base 1418. In a similar manner to the non-RO design, shutoff plugs in stanchions within base 1418 seal fluid flow until sump housing 1400 is inserted in filter base 100. Upon insertion, fluid would flow to the filter housing assembly and permeate water would be returned from the filter housing assembly.

All parts of the sump housing and base may be made using molded plastic parts according to processes known in the art.

The filter assembly is preferably mounted on a surface in proximity to a source of water. The mounting means are also preferably in close proximity to the use of the filtered water produced by the filter housing apparatus.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

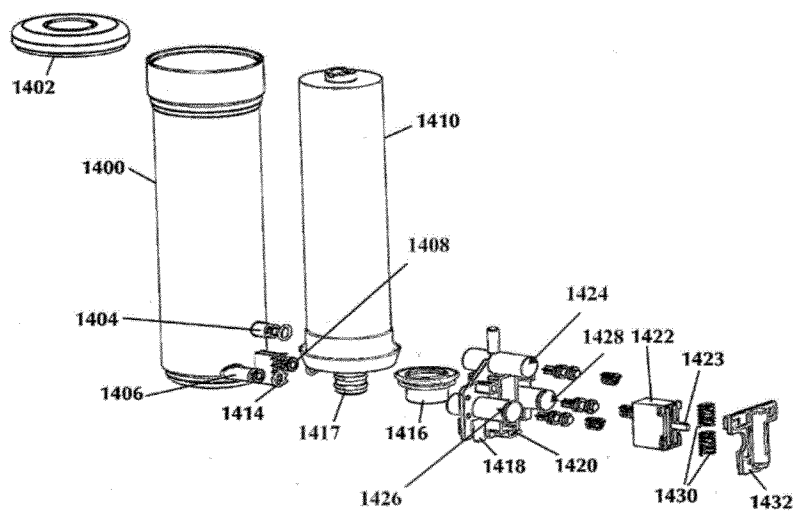

The invention claimed is:

1. A reverse osmosis filter base for releasably connecting a complementary mating reverse osmosis filter cartridge, wherein said reverse osmosis filter base comprises:
a base platform having a raw water ingress port, a permeate egress port, and a reject water egress port; and
a slidable lock in sliding communication with said base platform, said slidable lock having an interior section bounded by internal sidewalls, said slidable lock including a shaped protrusion or drive key extending inwards from two opposing internal sidewalls for slidably contacting said complementary mating reverse osmosis filter cartridge, said shaped protrusion including an exposed angled face.

2. The reverse osmosis filter base of claim 1 wherein said slidable lock includes a position stop located above said shaped protrusion or drive key to provide a physical stop during insertion of said complementary mating reverse osmosis filter cartridge.

3. The reverse osmosis filter base of claim 1 wherein said shaped protrusion or drive key includes a track structure extending across said slidable lock.

4. The reverse osmosis filter base of claim 1 including an enclosure on or integral with said base platform for retaining said slidable lock, said enclosure retaining said slidable lock such that said slidable lock moves relative to said enclosure.

5. A refrigerator in combination with a filter base assembly comprising:
an outer cabinet;
a refrigeration compartment disposed within said outer cabinet and having a rear wall, a pair of opposing side walls, at least one door disposed opposite said rear wall, a top and a bottom;
a freezer compartment disposed in said outer cabinet and adjacent to said refrigeration compartment;
a water dispenser disposed in said door and in fluid communication with said filter base assembly with an attachment assembly for changing a sump and filter media from said refrigerator, said attachment assembly responsive to an insertion push of said sump; and
said filter base assembly having a base platform and a slidable lock in sliding communication with said base platform, said slidable lock having an interior section bounded by internal sidewalls, said slidable lock including a shaped protrusion or drive key extending inwards from two opposing internal sidewalls for slidably contacting a complementary mating filter cartridge, said shaped protrusion including an exposed angled face.

6. The combination of claim 5 wherein said filter base assembly includes a raw water ingress port, a permeate egress port, and a reject water egress port, and is capable of receiving a reverse osmosis filter cartridge.

7. A refrigerator in combination with a filter assembly comprising:
an outer cabinet;
a refrigeration compartment disposed within said outer cabinet and having a rear wall, a pair of opposing side walls, at least one door disposed opposite said rear wall, a top and a bottom; and
a water dispenser in fluid communication with said filter assembly, said filter assembly including a filter base including:
a base platform having a raw water ingress port, a permeate egress port, and a reject water egress port; and
a slidable lock in sliding communication with said base platform, said slidable lock having an interior section bounded by internal sidewalls, said slidable lock including a shaped protrusion or drive key extending inwards from two opposing internal sidewalls for slidably contacting a complementary mating reverse osmosis filter cartridge, said shaped protrusion including an exposed angled face.

8. The combination of claim 7 including a filter housing for enclosing a filter media, said filter housing having a body and a top portion for forming a fluid-tight seal with said body, said filter housing including:

a raw water ingress port, a permeate egress port, and a reject water egress port;

said filter housing releasably attachable to said filter base and in fluid communication with said filter base.

9. The combination of claim 8 wherein said filter housing includes a filter key integral with, or connectable to, said filter housing, and for mating attachment to said filter base, the filter key having a support structure with an upper exposed surface, a bottom surface opposite said upper exposed surface, and an attachment finger located on said upper exposed surface and extending outwardly from said upper exposed surface in a direction parallel to a first plane perpendicular with said upper exposed surface, wherein the attachment finger includes a first exposed face that forms at least in part a first angle with respect to said first plane.

10. The combination of claim 9 including a second exposed face of said attachment finger in a direction opposite said first exposed face, forming at least in part a second angle with respect to said first plane.

11. The combination of claim 10 wherein angle magnitudes of said first angle and said second angle measured relative to said first plane are not equal.

12. The combination of claim 9, wherein the attachment finger includes a diamond-shaped cross-section in a second plane perpendicular to said first plane, said diamond-shaped cross-section having two upper exposed faces and two lower exposed faces.

13. A filter base for releasably connecting to a complementary mating filter housing assembly comprising:

a base platform having at least a fluid ingress port and a fluid egress port; and a floating lock in sliding communication with said base platform, having an exposed bottom surface, a top surface opposite said bottom surface, and longitudinal and lateral sides with corresponding internal side faces, said floating lock including:

at least one spaced protrusion or drive key on said longitudinal side extending inwards from said corresponding internal side face, said shaped protrusion or drive key for slidably contacting said complementary mating filter housing assembly, said at least one shaped protrusion or drive key including an angled face exposed towards the bottom surface.

14. The filter base of claim 13 wherein said floating lock includes a position stop centered about said lateral sides, and located above said at least one drive key to provide a physical stop during insertion of said complementary mating filter key.

15. A reverse osmosis filter base for releasably connecting a complementary mating reverse osmosis filter cartridge, wherein said reverse osmosis filter base comprises:

a base platform having a raw water ingress port, a permeate egress port, and a reject water egress port; and a floating lock in sliding communication with said base platform, having a bottom surface, a top surface, longitudinal sides, and lateral sides shorter than said longitudinal sides, said floating lock including:

spaced protrusions, drive keys, or fingers on said longitudinal sides extending laterally inwards, including at least one shaped protrusion, finger, or drive key for slidably contacting said complementary mating reverse osmosis filter cartridge, said at least one shaped protrusion, finger, or drive key including an angled face exposed towards the bottom surface.

16. A reverse osmosis filter base in combination with a reverse osmosis filter housing assembly, said combination comprising:

a filter base having a raw water ingress port, a permeate egress port, and a reject water egress port on a base platform;

a slidable lock in slidable contact with said filter base, said lock having a drive key or lateral extension;

a resilient member in contact with said lock, providing a retraction force for said lock;

said reverse osmosis filter housing assembly including a filter key located on said filter housing assembly, said filter key having a support structure with an upper exposed surface, a bottom opposite said upper exposed surface, and an attachment finger located on said upper exposed surface and extending outwardly from said upper exposed surface in a direction parallel to a first plane perpendicular with said upper exposed surface, wherein the attachment finger includes a first exposed face that forms at least in part a first angle with respect to said first plane.

17. The combination of claim 16 wherein said slidable lock includes an exposed bottom surface, an opposing top surface, a cavity having at least two internal sidewalls, and opposing drive keys on said at least two internal side walls extending inwards for slidably receiving said filter key, said opposing drive keys including an angled portion exposed towards said slidable lock exposed bottom surface, and an edge or wedge for releasably contacting with a portion of said filter key.

18. The combination of claim 17 including a position key centered about said slidable lock, and located above said drive keys to provide a physical stop during insertion of said filter housing assembly.

* * * * *

UNITED STATES PATENT AND TRADEMARK OFFICE
CERTIFICATE OF CORRECTION

PATENT NO. : 11,376,530 B2
APPLICATION NO. : 16/814279
DATED : July 5, 2022
INVENTOR(S) : Stephen P. Huda et al.

It is certified that error appears in the above-identified patent and that said Letters Patent is hereby corrected as shown below:

On the Title Page

Showing the illustrative figure, should be deleted and substitute therefor the attached Title Page.

In the Drawings

Please replace Fig. 13 with Fig. 13 as shown on the attached page.

In the Specification

Column 18, Line 64, change "14244" to "1424".

Column 18, Line 35, change "1418" to "1417".

Signed and Sealed this
Eighteenth Day of July, 2023

*Katherine Kelly Vidal*
*Director of the United States Patent and Trademark Office*

(12) United States Patent
Huda et al.

(10) Patent No.: US 11,376,530 B2
(45) Date of Patent: *Jul. 5, 2022

(54) REVERSE OSMOSIS PUSH FILTER WITH FLOATING KEY LOCK

(71) Applicant: KX Technologies LLC, West Haven, CT (US)

(72) Inventors: Stephen P. Huda, Shelton, CT (US); Michael J. Sherman, Woodbury, MN (US); Steven J. Haehn, Oakdale, MN (US); Erik R. Klimpel, Woodbury, MN (US); Sathyanarayana Jujaray, Bangalore (IN); Vivek Kunwar Narendra Singh, Nagpur (IN)

(73) Assignee: KX Technologies LLC, West Haven, CT (US)

(*) Notice: Subject to any disclaimer, the term of this patent is extended or adjusted under 35 U.S.C. 154(b) by 146 days.

This patent is subject to a terminal disclaimer.

(21) Appl. No.: 16/814,279

(22) Filed: Mar. 10, 2020

(65) Prior Publication Data
US 2020/0206660 A1 Jul. 2, 2020

Related U.S. Application Data

(60) Division of application No. 15/879,667, filed on Jan. 25, 2018, now Pat. No. 10,695,698, which is a (Continued)

(51) Int. Cl.
*B01D 29/96* (2006.01)
*B01D 17/00* (2006.01)
*B01D 35/30* (2006.01)

(52) U.S. Cl.
CPC ............ *B01D 29/96* (2013.01); *B01D 17/10* (2013.01); *B01D 35/30* (2013.01); (Continued)

(58) Field of Classification Search
None
See application file for complete search history.

(56) References Cited

U.S. PATENT DOCUMENTS 3,679,317 A 7/1972 Larson
3,694,603 A 9/1972 Congelliere
(Continued)

FOREIGN PATENT DOCUMENTS

DE 102006044744 3/2008
KR 200415015 4/2006
(Continued)

*Primary Examiner* — Benjamin M Kurtz
(74) *Attorney, Agent, or Firm* — DeLio Peterson & Curcio LLC; Robert Curcio

(57) ABSTRACT

A reverse osmosis filter assembly for fluid filtration having a push-activated lock and release mechanism. A push filter design activates a floating key lock upon insertion and extraction, where the filter key may be used simultaneously as a lock and as an identifier for particular filter attributes. The filter base may be situated inline, and in fluid communication, with the raw water ingress, permeate egress, and reject water egress. The reverse osmosis filter housing assembly may be attached to, and removed from, the filter base by a push-actuated release. Upon insertion, the filter key shifts the filter lock longitudinally to receive interlocking segments. Upon extraction, the same axial push shifts the filter lock further to align the interlocking fingers within gaps that allow for easy extraction. The specific key lock design allows a user to identify and match certain filter configurations received by the mechanical support, and reject other filter configurations.

18 Claims, 24 Drawing Sheets